US007864261B2

(12) United States Patent  
Chen et al.

(10) Patent No.: US 7,864,261 B2  
(45) Date of Patent: Jan. 4, 2011

(54) OPTICAL FILM SUPPORT ARRANGEMENT, AND BACKLIGHT MODULE AND LCD USING THE SAME

(75) Inventors: Weisen Chen, Tainan County (TW); Hung-Ming Hsieh, Tainan County (TW)

(73) Assignee: Chi Mei Optoelectronics Corp., Tainan County (TW)

( * ) Notice: Subject to any disclaimer, the term of this patent is extended or adjusted under 35 U.S.C. 154(b) by 358 days.

(21) Appl. No.: 12/184,920

(22) Filed: Aug. 1, 2008

(65) Prior Publication Data

US 2009/0033827 A1 Feb. 5, 2009

(30) Foreign Application Priority Data

Aug. 3, 2007 (TW) .............................. 96128757 A

(51) Int. Cl.
*G02F 1/1333* (2006.01)

(52) U.S. Cl. ....................................................... 349/58

(58) Field of Classification Search .................... 349/58
See application file for complete search history.

(56) References Cited

U.S. PATENT DOCUMENTS

| 5,729,310 | A  | * | 3/1998  | Horiuchi et al. | 349/62 |
| 6,175,396 | B1 | * | 1/2001  | Kim et al. | 349/58 |
| 2005/0062902 | A1 | * | 3/2005  | Fukayama | 349/58 |
| 2005/0099554 | A1 | * | 5/2005  | Hayano | 349/58 |
| 2005/0243238 | A1 | * | 11/2005 | Cha et al. | 349/58 |
| 2006/0007367 | A1 | * | 1/2006  | Cho | 349/58 |

* cited by examiner

*Primary Examiner*—James A Dudek

(57) ABSTRACT

A backlight module includes a rear plate, at least one light source disposed on the rear plate, at least two support elements respectively disposed on two opposite sides of the rear plate, and at least one optical film disposed above the light source. The optical film includes at least two fixing holes respectively corresponding to the support elements. The support elements respectively engage with the fixing holes to tension the optical film with at least one pair of tensile forces oriented in opposite directions.

20 Claims, 25 Drawing Sheets

OPTICAL FILM SUPPORT ARRANGEMENT, AND BACKLIGHT MODULE AND LCD USING THE SAME

This application claims the benefit of Taiwan application Ser. No. 96128757, filed Aug. 3, 2007, the entire subject matter of which is incorporated herein by reference.

TECHNICAL FIELD

The disclosure relates to a display device, and more particularly, to an optical film support arrangement for a backlight module and its application in a liquid crystal display (LCD).

BACKGROUND

In current liquid crystal display devices, in order to enhance the optical quality of display areas, for example, to increase the brightness and its uniformity, optical film sets are usually disposed in the backlight modules. When an optical film set is applied in a direct type backlight module, usually the optical film set is directly disposed on a diffusion plate, and when an optical film set is applied in an edge type backlight module, usually the optical film set is directly disposed on a light guide plate.

FIG. 1 is a cross-sectional view of a portion of a conventional liquid crystal display. For example, a liquid crystal display 100 is mainly composed of a direct type backlight module 104 and a liquid crystal display panel 102, wherein the backlight module 104 is disposed on a rear surface of the liquid crystal display panel 102 to provide back light for the liquid crystal display panel 102. The liquid crystal display panel 102 mainly includes a color filter 118, a transistor substrate 120 and a liquid crystal layer (not shown) held between the color filter 118 and the transistor substrate 120, wherein the color filter 118 is stacked on the transistor substrate 120. In addition, the liquid crystal display panel 102 typically further includes an up polarizer 116 and a down polarizer 122, wherein the up polarizer 116 is stacked on the color filter 118, and the transistor substrate 120 is stacked on the down polarizer 122.

The direct type backlight module 104 mainly includes a rear plate 106, at least one light source 108, a diffusion plate 110, an optical film set 112 and a frame 114. The light source 108 is typically a cold cathode fluorescent lamp (CCFL), and the light source 108 is disposed on the inner side of the rear plate 106. The frame 114 is usually set on the outer edge of the rear plate 106. The diffusion plate 110 is disposed on the light source 108 and is carried by the rear plate 106. The optical film set 112 is stacked on the diffusion plate 110 and is supported by the diffusion plate 110. The liquid crystal display panel 102 is disposed on the optical film set 112 of the backlight module 104, wherein the liquid crystal display panel 102 is carried and supported by the frame 114 set on the outer edge of the rear plate 106.

FIG. 2 illustrates a cross-sectional view of a portion of another conventional liquid crystal display. A liquid crystal display 200 is mainly composed of an edge type backlight module 204 and a liquid crystal display panel 202, wherein the backlight module 204 is disposed on a rear surface of the liquid crystal display panel 202 to provide back light for the liquid crystal display panel 202. Similarly, the liquid crystal display panel 202 mainly includes a color filter 216, a transistor substrate 218 and a liquid crystal layer (not shown) held between the color filter 216 and the transistor substrate 218, wherein the color filter 216 is stacked on the transistor substrate 218. In addition, the liquid crystal display panel 202 further includes an up polarizer 222 and a down polarizer 220, wherein the up polarizer 222 is stacked on the color filter 216, and the transistor substrate 218 is stacked on the down polarizer 220.

The edge type backlight module 204 mainly includes a rear plate 206, at least one light source 224, a light guide plate 210, an optical film set 212 and a frame 214. The rear plate 206 is mainly composed of a bottom plate 228 and a side plate 226, wherein the side plate 226 is usually set and stands on the outer edge of the bottom plate 228. The light guide plate 210 is disposed in the rear plate 206 and on the bottom plate 228, wherein a reflective sheet 208 is usually disposed between the bottom plate 228 and the light guide plate 210 to reflect and effectively employ the light emitted toward the bottom plate 228 of the rear plate 206. The light source 224 is usually a cold cathode fluorescent lamp, and the light source 224 is disposed on the inner side of the rear plate 206, on an inner side surface of the side plate 226 of the rear plate 206 and between the side plate 226 and a side surface of the light guide plate 210. The frame 214 is usually embedded on the side plate 226 of the rear plate 206, wherein a portion of the frame 214 extends on the outer region of the light guide plate 210. The optical film set 212 is stacked on the light guide plate 210 and is supported by the light guide plate 210. The frame 214 extends on the outer region of the light guide plate 210 and simultaneously presses on the outer edge of the optical film set 212. The liquid crystal display panel 202 is disposed on the optical film set 212 of the backlight module 204, wherein the liquid crystal display panel 202 is carried and supported by the frame 214.

In the direct type backlight module or the edge type backlight module described above, the optical film set is directly connected with and supported by the diffusion plate or the light guide plate, so that there is no gap between the optical film set and the diffusion plate or between the optical film set and the light guide plate. However, a gap, e.g., an air layer, may be needed between the optical film set and the diffusion plate or the light guide plate to be the medium of light transmission in a future optical design. In addition, a backlight module may not include a diffusion plate, considering the cost of a future display device. Accordingly, an improved support for the optical films will become important in the development of liquid crystal display devices.

SUMMARY

In an aspect, a backlight module comprises a rear plate, at least one light source disposed on the rear plate, at least two support elements respectively disposed on two opposite sides of the rear plate, and at least one optical film disposed above the light source. The optical film comprises at least two fixing holes respectively corresponding to the support elements. The support elements respectively engage with the fixing holes to tension the optical film with at least one pair of tensile forces oriented in opposite directions.

In another aspect, an optical film support arrangement for a backlight module of a liquid crystal display comprises a rear plate, and at least two support elements respectively disposed on two opposite sides of the rear plate for respectively engaging at least two fixing holes of an optical film to be supported and for tensioning the optical film with at least one pair of tensile forces oriented in opposite directions.

In a further aspect, a liquid crystal display comprises a backlight module and a display panel disposed on the backlight module. The backlight module comprises a rear plate, at least one light source disposed on the rear plate, at least two support elements respectively disposed on two opposite sides of the rear plate, and at least one optical film disposed above the light source. The optical film comprises at least two fixing holes respectively corresponding to the support elements. The support elements respectively engage with the fixing holes to tension the optical film with at least one pair of tensile forces oriented in opposite directions.

BRIEF DESCRIPTION OF THE DRAWINGS

One or more embodiments are illustrated by way of example, and not by limitation, in the figures of the accompanying drawings, wherein elements having the same reference numeral designations represent like elements throughout and wherein:

FIG. 12A is an enlarged view of a portion of the backlight module of FIG. 12;

FIG. 14A is an enlarged view of a portion of the backlight module of FIG. 14;

DETAILED DESCRIPTION OF THE EMBODIMENTS

Figure 1:
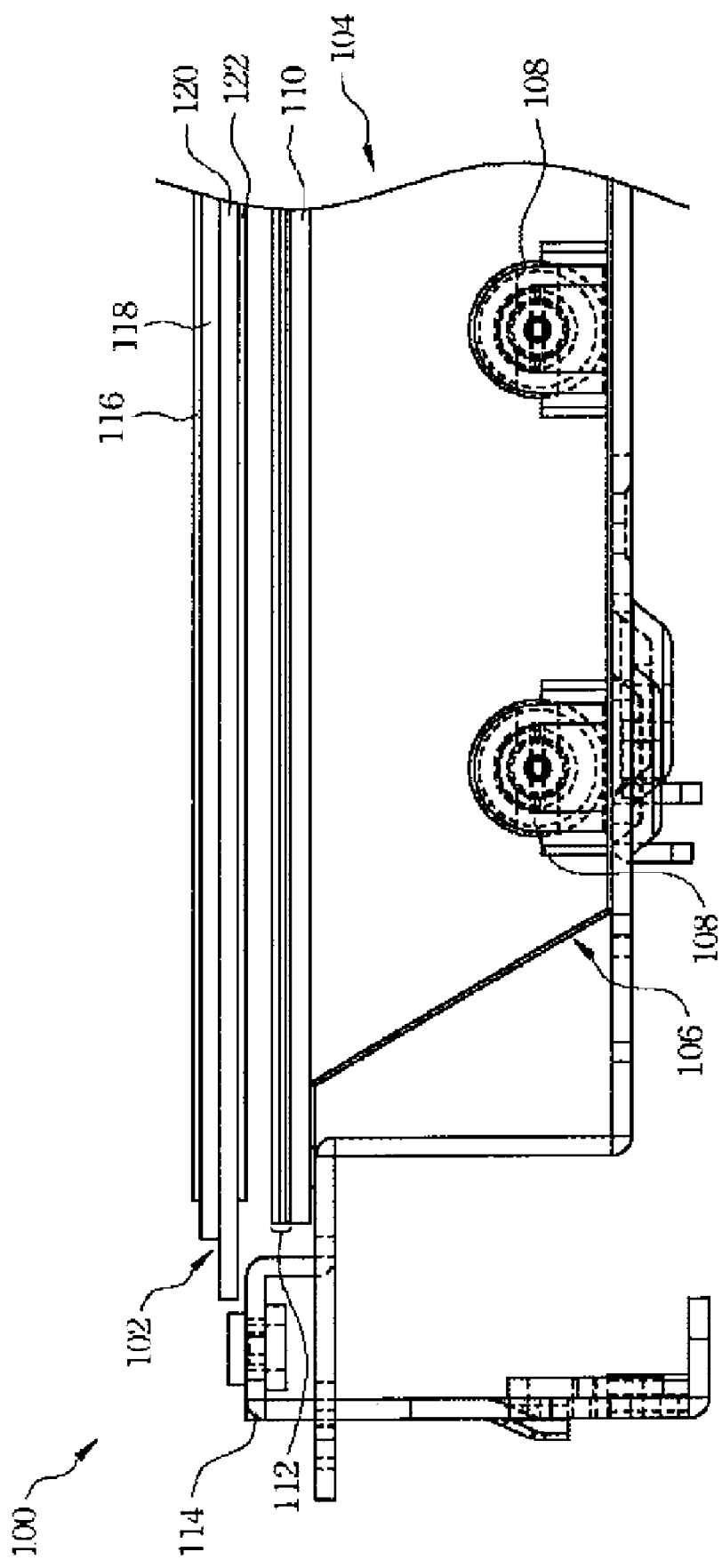
FIG. 1 is a cross-sectional view of a portion of a conventional liquid crystal display.
Figure 2:
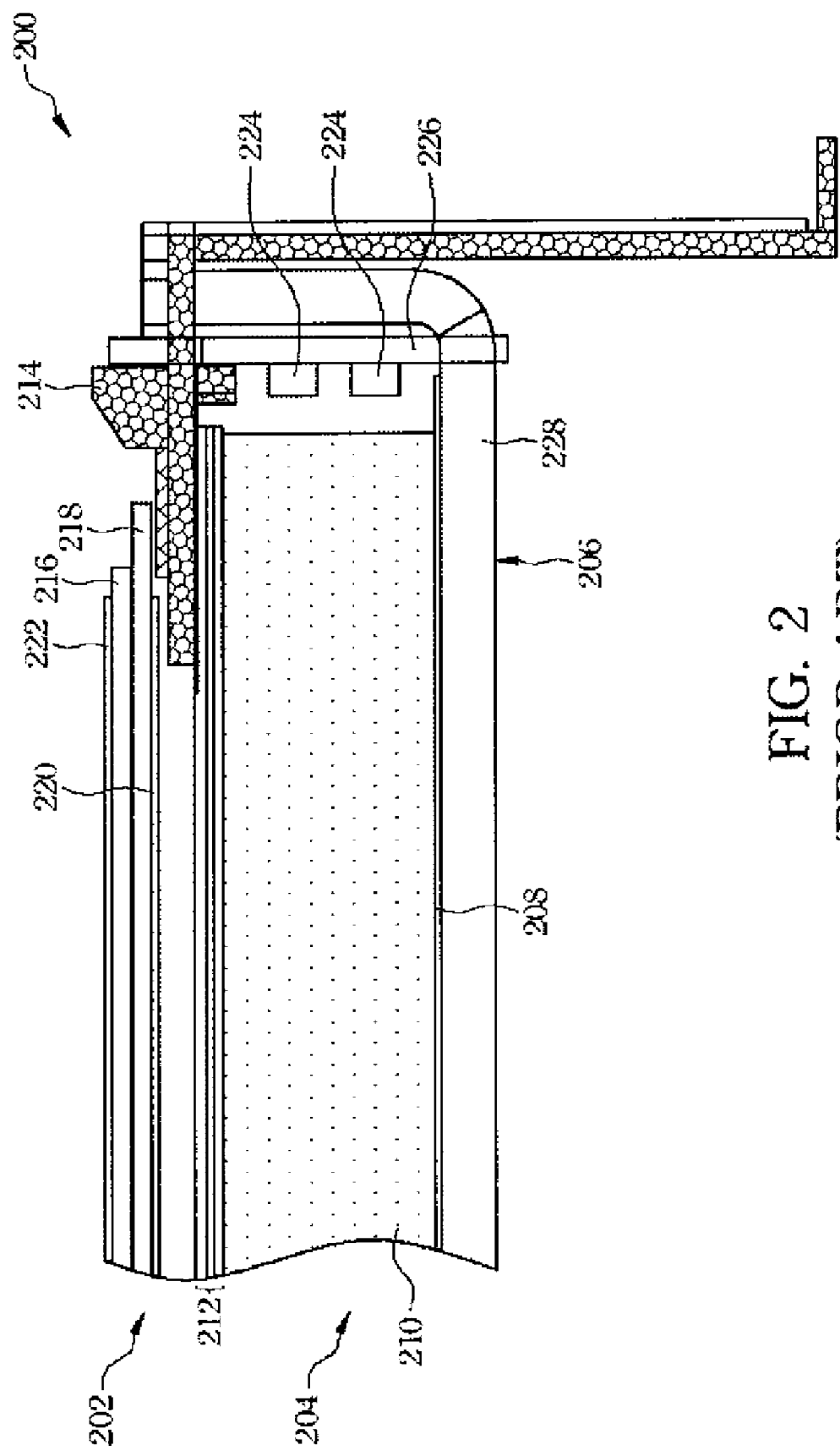
FIG. 2 is a cross-sectional view of a portion of another conventional liquid crystal display.
Figure 3:
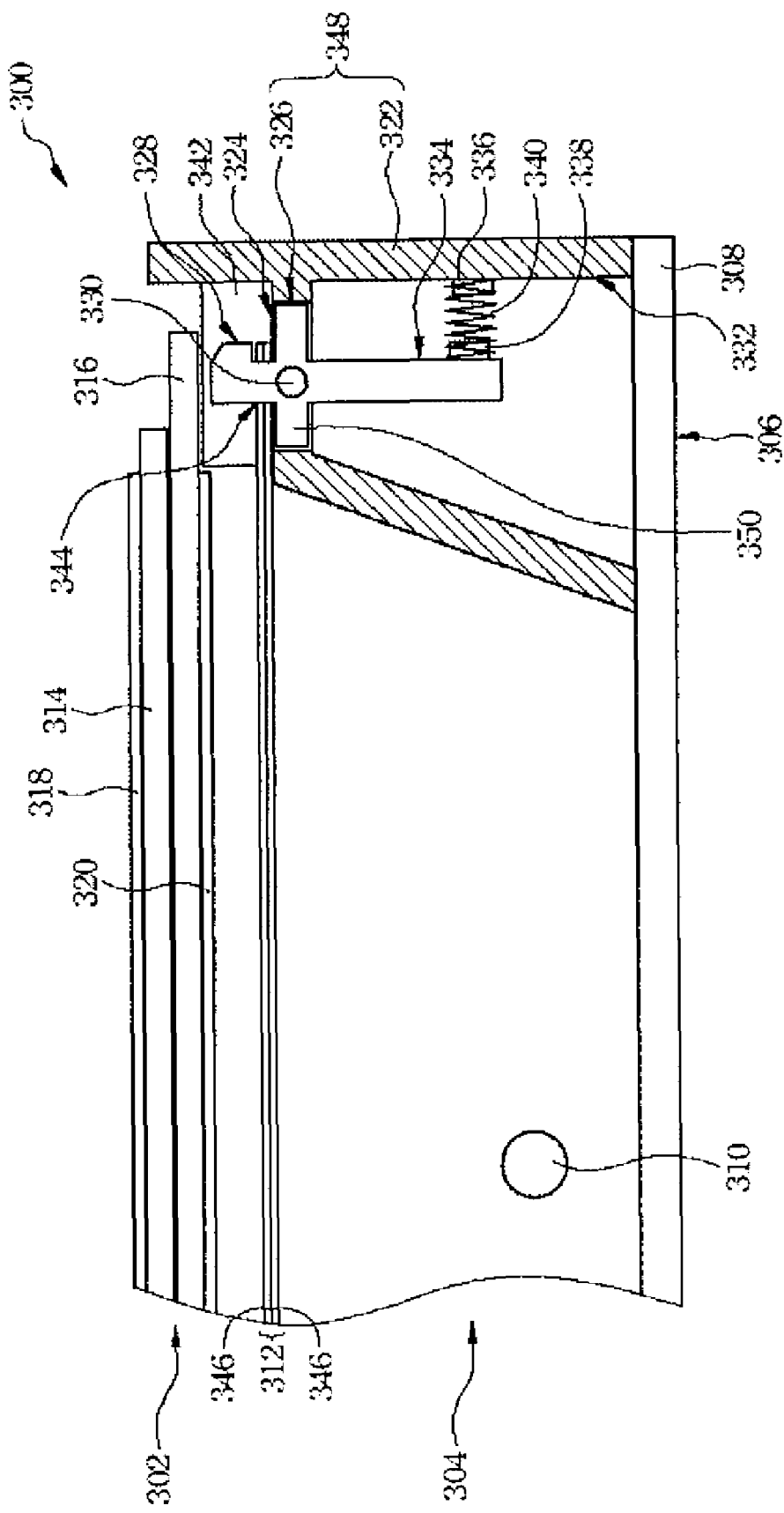
FIG. 3 is a side view of a portion of a liquid crystal display in accordance with a first embodiment of the present invention.

FIG. 3 is a side view of a portion of a liquid crystal display in accordance with a first embodiment of the present invention. A liquid crystal display 300 mainly includes a display panel 302 and a backlight module 304, wherein the display panel 302 is disposed on the backlight module 304, i.e., the backlight module 304 is on a rear side of the display panel 302. In the present embodiment, the display panel 302 is a liquid crystal display panel, wherein the display panel 302 mainly includes a color filter 314, a transistor substrate 316 and a liquid crystal layer (not shown) held between the color filter 314 and the transistor substrate 316, wherein the color filter 314 is stacked on the transistor substrate 316. In addition, the display panel 302 typically further includes an up polarizer 318 and a down polarizer 320, wherein the up polarizer 318 is stacked on the color filter 314, and the transistor substrate 316 is stacked on the down polarizer 320.

The backlight module 304 comprises a rear plate 306, at least one light source 310, at least two support elements 348 and at least one optical film 346. The backlight module 304 of the present exemplary embodiment includes a plurality of light sources 310 and an optical film set 312 composed of two optical films 346. The light source 310 is, for example, a cold cathode fluorescent lamp or an LED light bar. The kinds and the quantities of the optical films 346 of the optical film set 312 may be adjusted according to the product requirement, wherein the optical film 346 may be a diffusion plate, a prism sheet etc. Typically, the rear plate 306 mainly includes a bottom plate 308 and a plurality of side plates (not shown) set around the bottom plate 308. The rear plate 306 may be composed of a metal plate or a hard plastic plate. The light source 310 is disposed in the inner side of the rear plate 306 and on the bottom plate 308 of the rear plate 306, and the optical film set 312 is disposed above the light source 310.

Figure 4A:
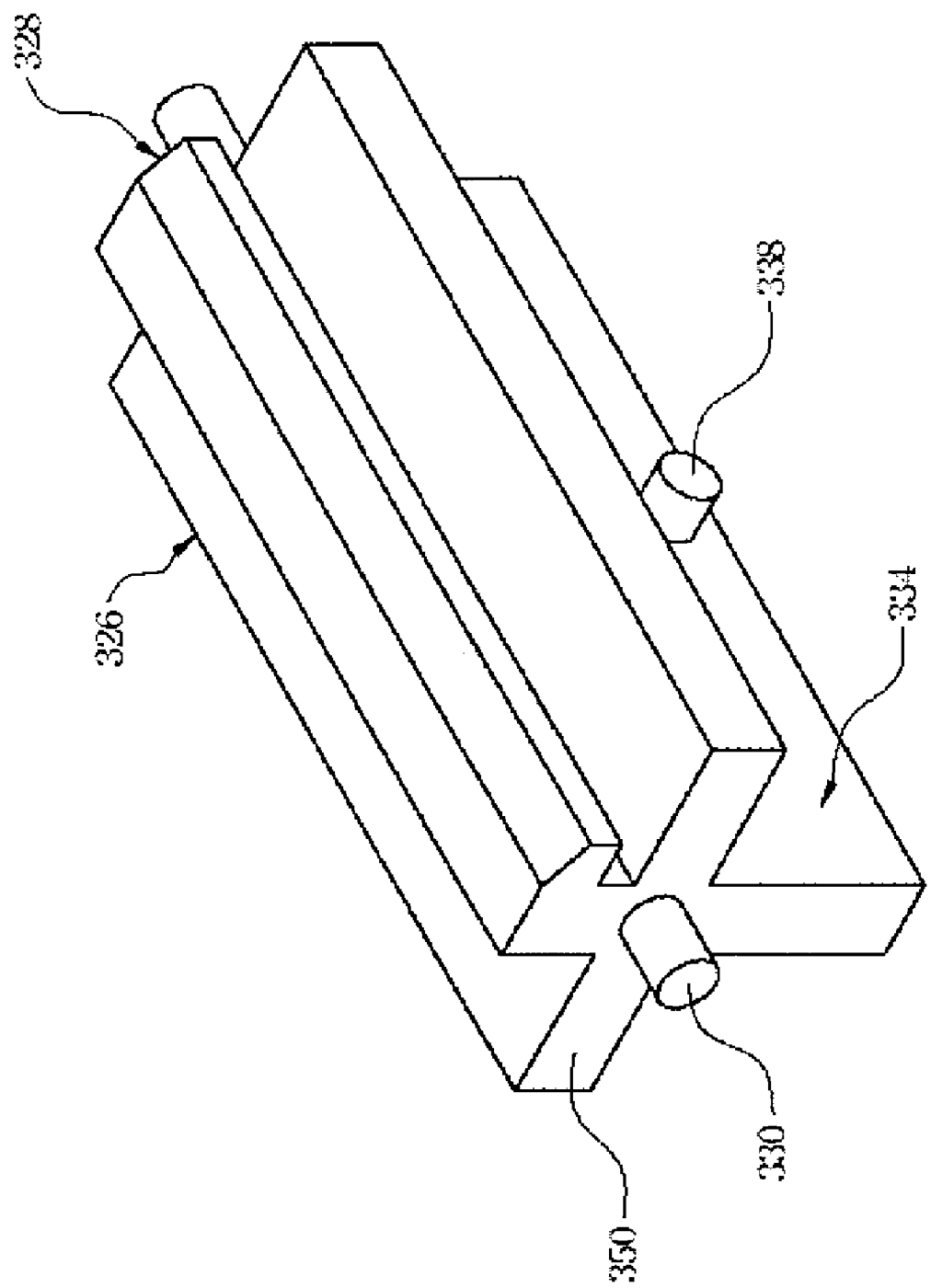
FIG. 4A is a perspective view of a portion of a support of a backlight module in accordance with the first embodiment of the present invention.
Figure 4B:
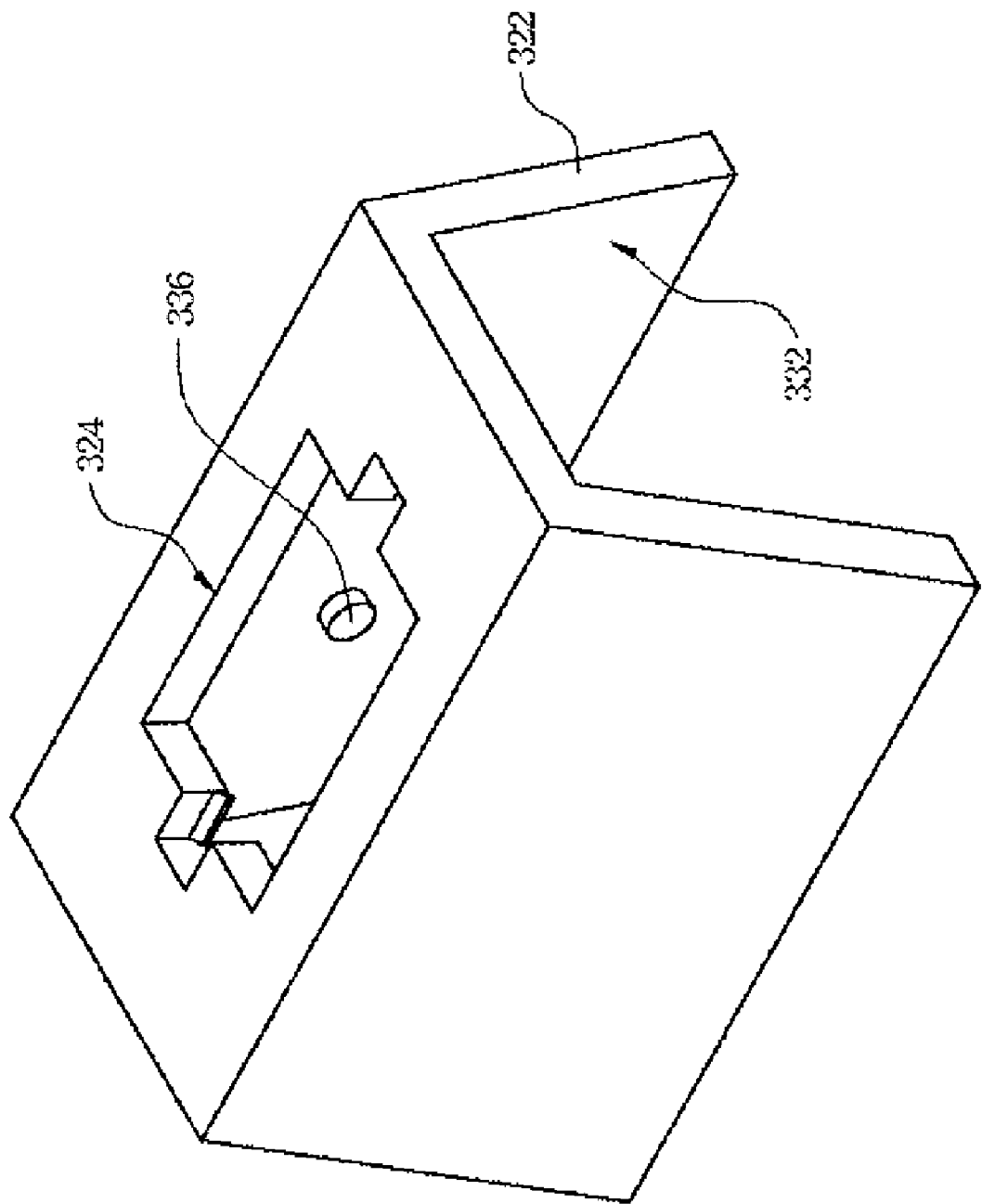
FIG. 4B is a perspective view of a portion of a supporting frame of the backlight module in accordance with the first embodiment of the present invention.
Figure 4C:
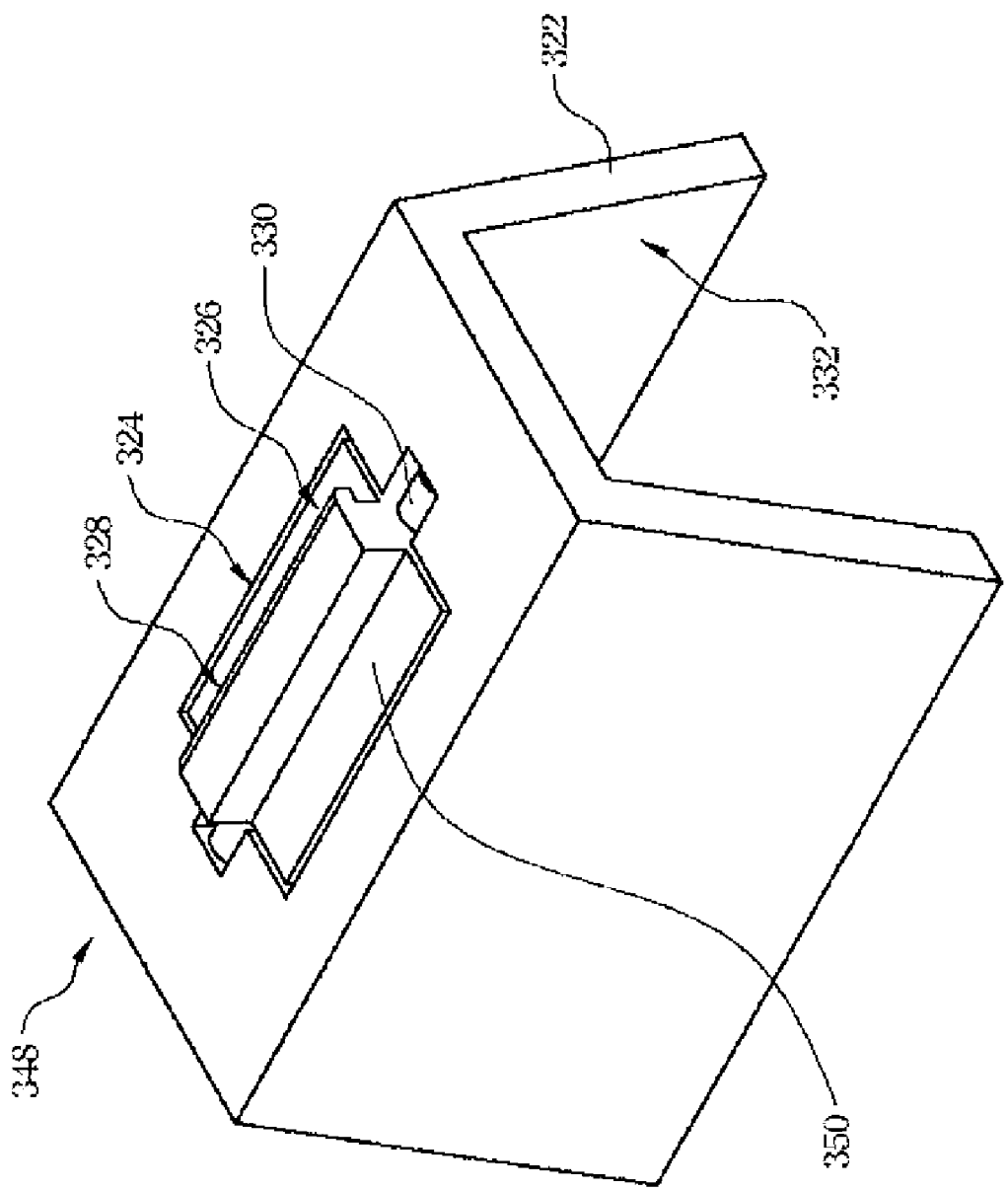
FIG. 4C is a perspective view of a portion of a support element of the backlight module in accordance with the first embodiment of the present invention.

In one embodiment, each support element 348 is mainly composed of a supporting frame 322 and at least one support 326. In the present exemplary embodiment, the backlight module 304 includes four support elements 348, and each support element 348 comprises a supporting frame 322 and a plurality of supports 326, wherein the support elements 348 are respectively disposed along the sides of the rear plate 306. In other embodiments, the backlight module 304 may include only two support elements 348, and the support elements 348 are respectively disposed on two opposite sides of the rear plate 306. FIG. 4A is a perspective view of a portion of the support 326 of the backlight module in accordance with the first embodiment of the present invention, FIG. 4B is a perspective view of a portion of the supporting frame 322 of the backlight module in accordance with the first embodiment of the present invention, and FIG. 4C is a perspective view of a portion of the support element 348 of the backlight module in accordance with the first embodiment of the present invention. Each support 326 comprises a carrying portion 350, a hook 328 and two rotation portions 330, wherein the rotation portions 330 are respectively disposed on two opposite sides of the carrying portion 350 of the support 326, and the hook 328 protrudes on the carrying portion 350, as shown in FIG. 4A. A top surface of the supporting frame 322 is set with at least one opening 324, as shown in FIG. 4B. The size of the opening 324 is slightly larger than that of the carrying portion 350 of the support 326, and the support 326 is received in the opening 324 of the supporting frame 322, as shown in FIG. 4C. When the support 326 is disposed in the opening 324 in the top surface of the supporting frame 322, the rotation portions 330 of the support 326 are respectively disposed on two sides of the opening 324 of the supporting frame 322, wherein the rotation portions 330 can form a rotation axle, so that the support 326 can be rotatably mounted in the supporting frame 322. In the present embodiment, the top surface of each supporting frame 322 is set with a plurality of openings 324, and the supports 326 are correspondingly disposed in the openings 324.

In one embodiment, the backlight module 304 may further include at least one elastic element 340 (FIG. 3), wherein each support element 348 may be set with at least one elastic element 340, or only one of the opposite support elements 348 may be set with at least one elastic element 340. The number of the elastic elements 340 disposed in the supporting frame 322 of one support element 348 is usually the same as that of the supports 326 of this support element 348. As shown in FIGS. 3, 4A and 4C, the elastic element 340 is disposed between an inner side surface 332 of the supporting frame 322 of the support element 348 and an outer side surface 334 of the support 326 opposite the inner side surface 332. The hook 328 of the support 326 and the elastic element 340 are respectively disposed at two opposite sides of the carrying portion 350 of the support 326. The elastic element 340 may be a spring or an elastic chain. In another embodiment, in the support element 348 set with the elastic element 340, the inner side surface 332 of the supporting frame 322 may be further set with a positioning portion 336, as shown in FIGS. 3 and 4B. The opposite outer side surface 334 of the support 326 is set with a positioning portion 338 corresponding to the positioning portion 336, as shown in FIGS. 3 and 4A. The positioning portions 336 and 338 respectively disposed in two ends of the elastic element 340 between the inner side surface 332 of the supporting frame 322 and the outer side surface 334 of the support 326.

Figure 5:
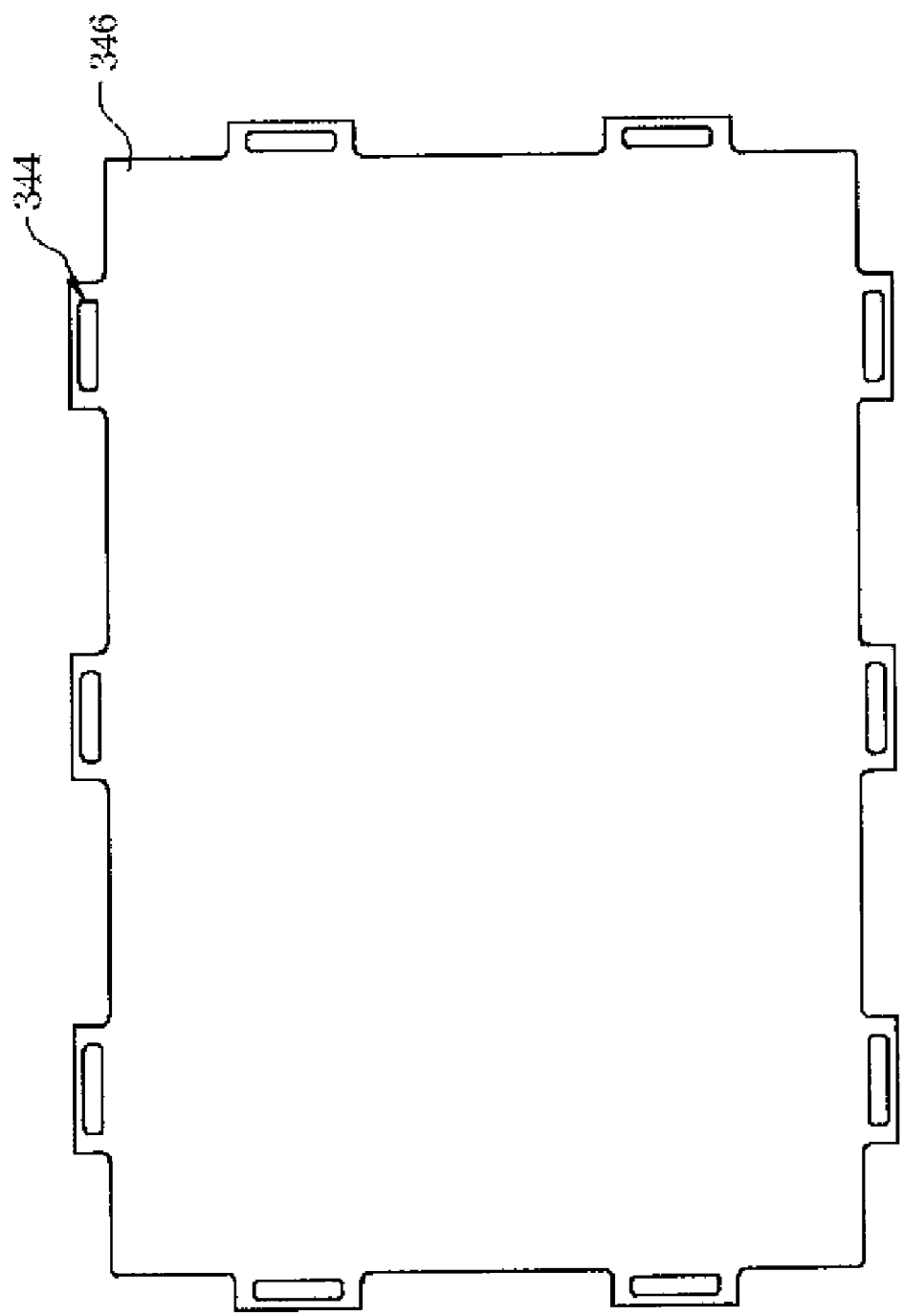
FIG. 5 is a top view of an optical film in accordance with the first embodiment of the present invention.

FIG. 5 is a top view of an optical film in accordance with the first embodiment of the present invention. Each optical film 346 of the optical film set 312 is set with at least two fixing holes 344, wherein the number and the location of the fixing holes 344 of the optical film 346 correspond to the number and the location of the supports 326 of the support element 348. The hooks 328 of the supports 326 may be respectively put in the corresponding fixing holes 344. In the present exemplary embodiment, each side of the optical film 346 is set with a plurality of fixing holes 344, as shown in FIG. 5. In other embodiments, only two opposite sides of the optical film 346 are each set with one fixing hole 344 and, accordingly, only two sides of the backlight module 304 are each set with one support element 348 and each support element 348 is only set with one support 326, wherein the fixing holes 344 respectively correspond to the supports 326.

In one exemplary embodiment, two corresponding supports 326 on the two opposite sides of the backlight module 304 respectively put in the corresponding fixing holes 344 of the optical film 346 can support and fix each optical film 346, can evenly spread the optical films 346 by tensioning the optical films 346 with one pair of tensile forces oriented toward two opposite outer sides, wherein the directions of the tensile forces are not parallel to the rotation axle formed by the rotation portions 330 of the support 326 providing the tensile forces. In the present exemplary embodiment, any two opposite sides of the backlight module 304 are each set with at least two supports 326, so that the optical films 346 can be tensioned at any two opposite sides thereof with at least two pairs of tensile forces oriented toward two opposite outer sides. In a further embodiment, a rotation torque can be further provided to the support 326 by the elastic force of the elastic element 340 between the inner side surface 332 of the supporting frame 322 of the support element 348 and the outer side surface 334 of the support 326, so that the tensile forces applied on the optical films 346 toward the outside by the support 326 can be further increased to greatly increase the evenness of the optical films 346.

As shown in FIG. 3, the backlight module 304 is usually set with a frame 342, wherein the frame 342 is usually embedded on the side plates of the rear plate 306 and set around the rear plate 306, and a portion of the frame 342 extends on the outer region of the backlight module 304. In the liquid crystal display 300, the display panel 302 is disposed on the frame 342, wherein the frame 342 supports the edge region of the display panel 302 and separates the display panel 302 from the optical film set 312 with a gap.

With the setting of the support elements 348 on two opposite sides or four sides of the backlight module 304 and the setting of the fixing holes 344 in the optical films 346 corresponding to the locations of the supports 326, the optical film set 312 can be successfully supported and fixed by the support elements 348. Therefore, the backlight module 304 may not need any diffusion plate to support the optical film set 312, so that the cost can be reduced.

Figure 6:
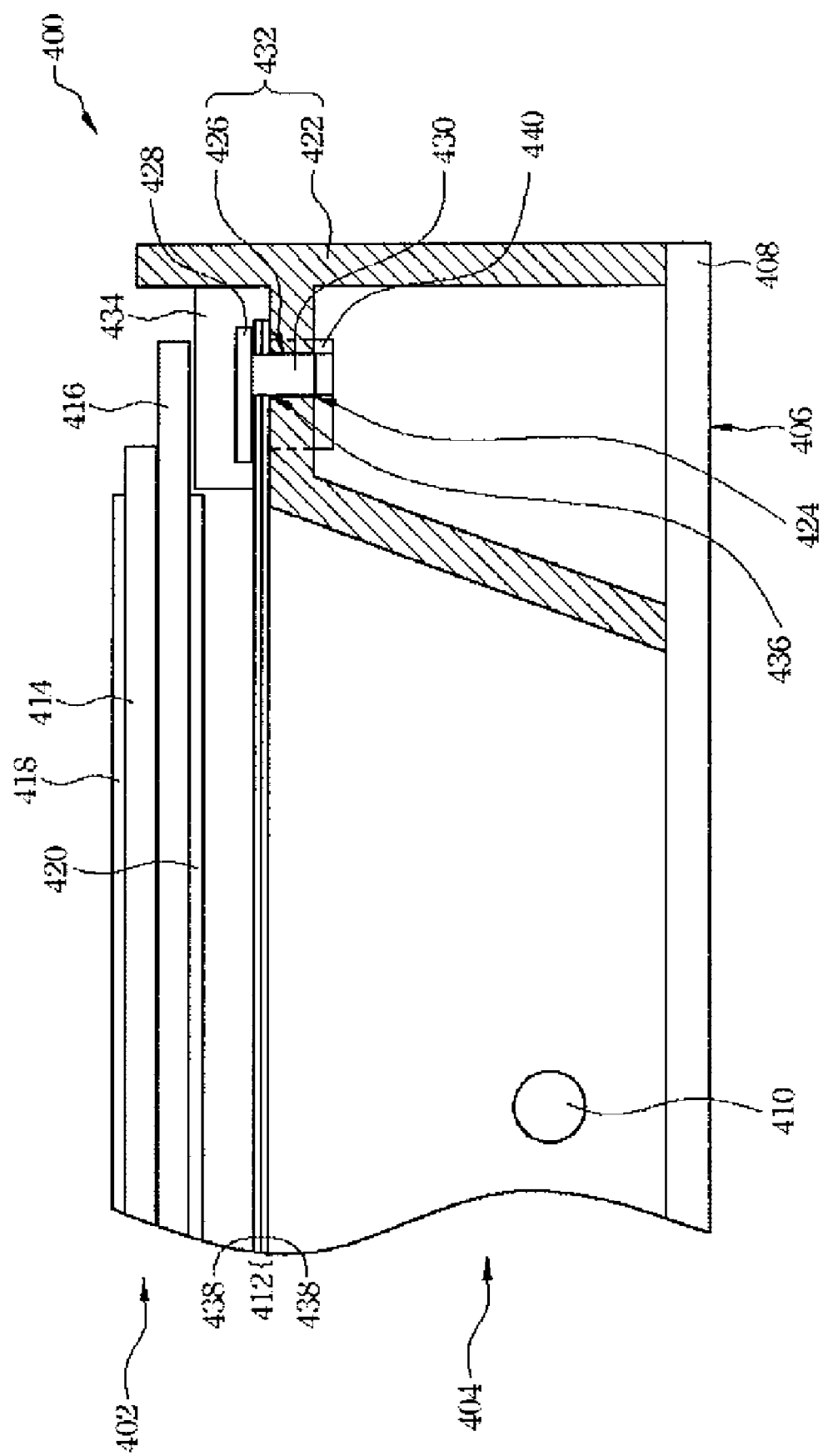
FIG. 6 is a side view of a portion of a liquid crystal display in accordance with a second embodiment of the present invention.

FIG. 6 is a side view of a portion of a liquid crystal display in accordance with a second embodiment of the present invention. A liquid crystal display 400 mainly includes a display panel 402 and a backlight module 404, wherein the display panel 402 is disposed on the backlight module 404, i.e., the backlight module 404 is on a rear side of the display panel 402. In the present embodiment, the display panel 402 is a liquid crystal display panel, and the components of the liquid crystal display panel are similar to those described in the first embodiment.

The backlight module 404 comprises a rear plate 406, at least one light source 410, at least two support elements 432 and at least one optical film 438. The backlight module 404 of the present exemplary embodiment includes a plurality of light sources 410 and an optical film set 412 composed of two optical films 438. Typically, the rear plate 406 mainly includes a bottom plate 408 and a plurality of side plates (not shown) set around the bottom plate 408. The rear plate 406 may be composed of a metal plate or a hard plastic plate. The light source 410 is disposed in the inner side of the rear plate 406 and on the bottom plate 408 of the rear plate 406, and the optical film set 412 is disposed above the light source 410.

In one embodiment, each support element 432 is mainly composed of a supporting frame 422 and at least one support 426. In the present exemplary embodiment, the backlight module 404 includes four support elements 432, and each support element 432 comprises a supporting frame 422 and a plurality of supports 426, wherein the support elements 432 are respectively disposed along the sides of the rear plate 406. In the other embodiments, the backlight module 404 may include only two support elements 432, and the support elements 432 are respectively disposed on two opposite sides of the rear plate 406.

Figure 7A:
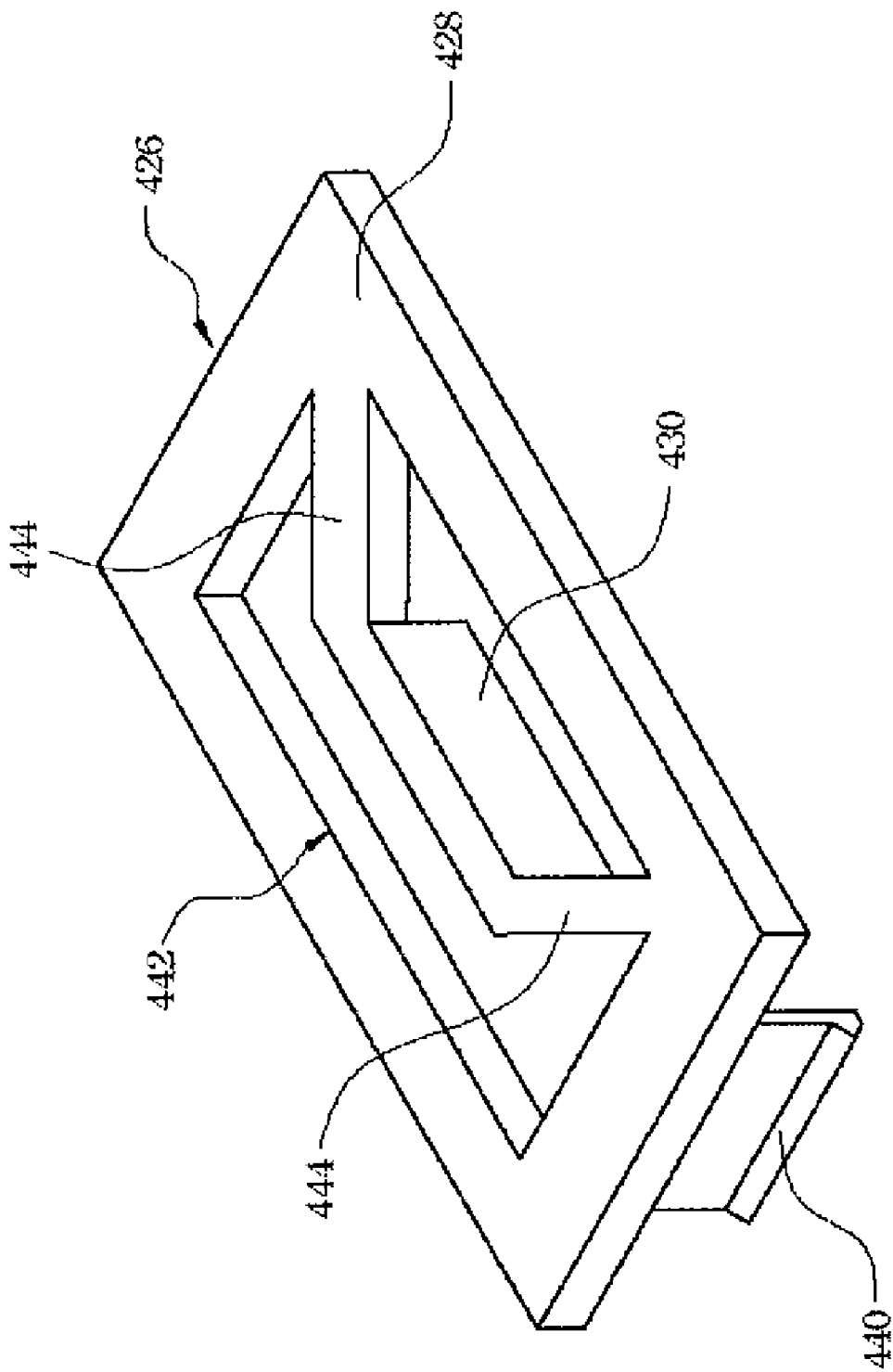
FIG. 7A is a perspective view of a top side of a support of a backlight module in accordance with the second embodiment of the present invention.
Figure 7B:
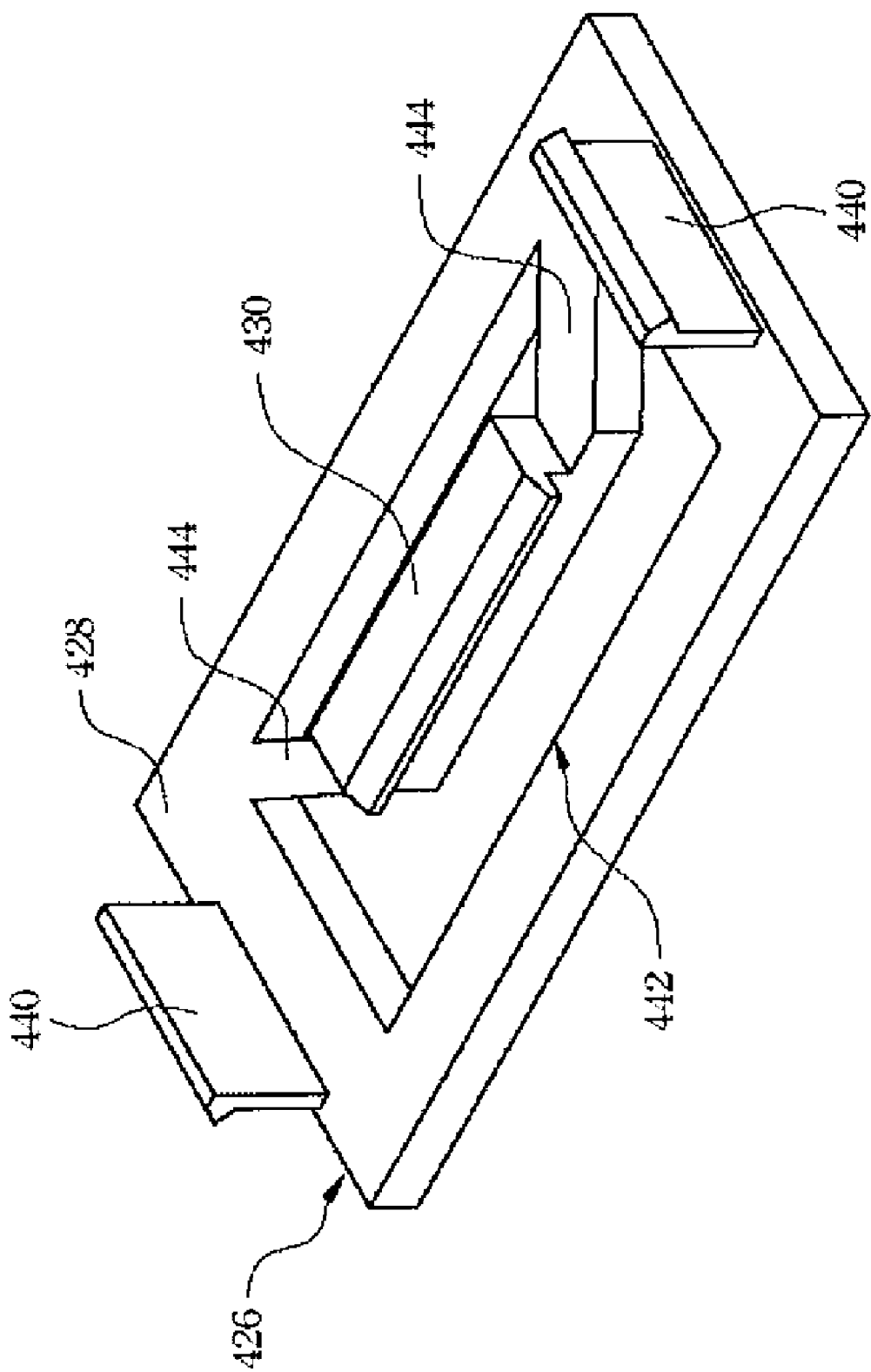
FIG. 7B is a perspective view of a bottom side of the support of the backlight module in accordance with the second embodiment of the present invention.

FIG. 7A is a perspective view of a top side of the support 426 of the backlight module in accordance with the second embodiment of the present invention, and FIG. 7B is a perspective view of a bottom side of the support 426. Each support 426 comprises a pressing portion 428 and a hook 430, wherein the pressing portion 428 includes an opening 442, the hook 430 is disposed in the opening 442 of the pressing portion 428 and protrudes on a lower surface of the pressing portion 428, as shown in FIGS. 7A and 7B. Optionally, the support 426 may further includes two fixing hooks 440, wherein the fixing hooks 440 are respectively disposed and protrude on two opposite ends of the lower surface of the pressing portion 428 of the support 426, as shown in FIG. 7B. Therefore, the fixing hooks 440 and the hook 430 protrude on the same side of the pressing portion 428. A top surface of the supporting frame 422 is set with at least one opening 424 (FIG. 6), wherein the opening 424 is slightly larger than the hook 430 of the support 426, so that the hook 430 of the support 426 can be inserted in the opening 424 of the supporting frame 422. In the present exemplary embodiment, the support 426 further comprises two elastic connection portions 444, wherein two opposite ends of the hook 430 of the support 426 can be respectively connected to inner sides of the opening 442 by the elastic connection portions 444, as shown in FIGS. 7A and 7B.

Figure 8:
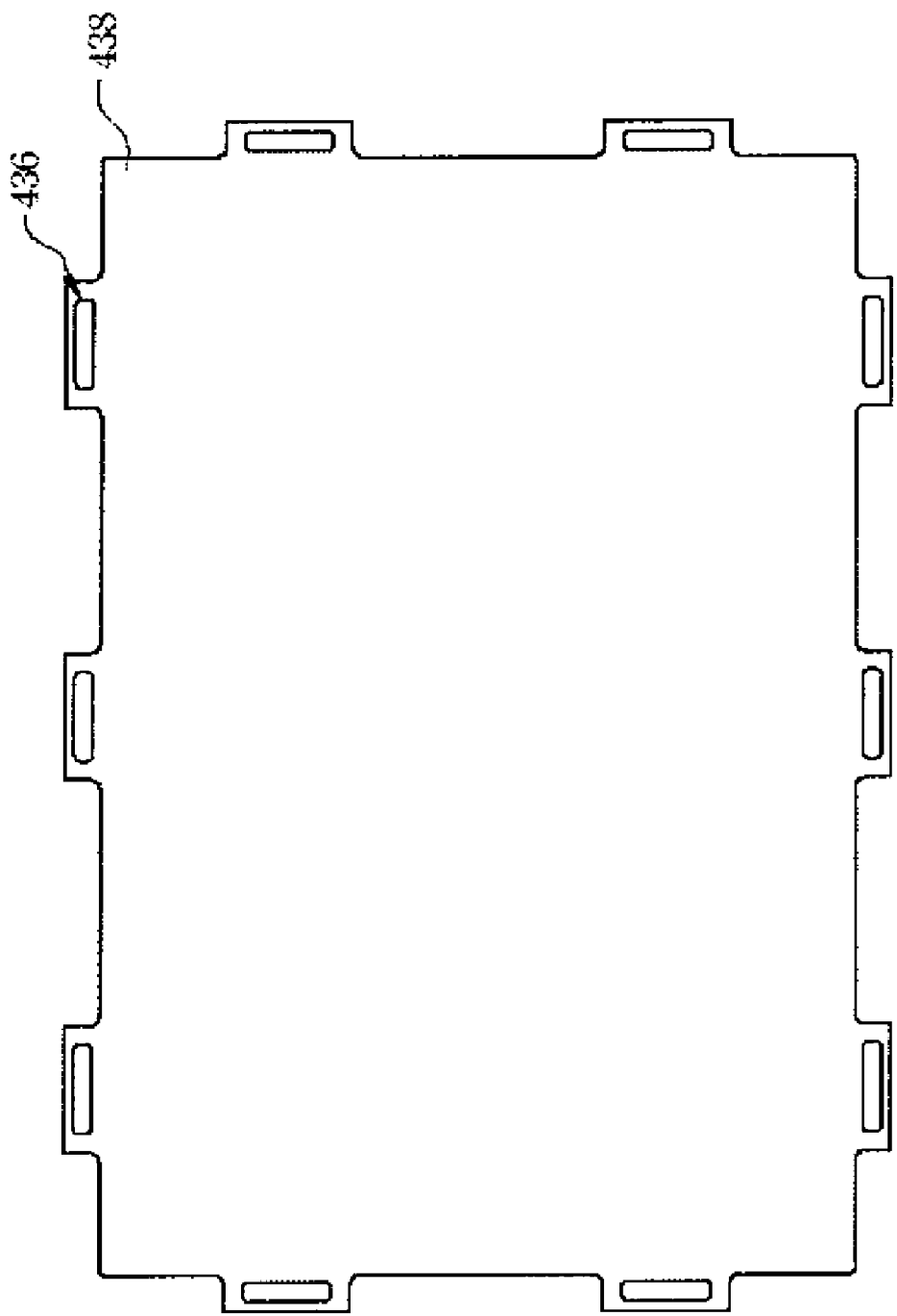
FIG. 8 is a top view of an optical film in accordance with the second embodiment of the present invention.

FIG. 8 is a top view of an optical film in accordance with the second embodiment of the present invention. Each optical film 438 of the optical film set 412 is set with at least two fixing holes 436, wherein the number and the location of the fixing holes 436 of the optical film 438 correspond to the number and the location of the supports 426 of the support element 432. The hooks 430 of the supports 426 may be respectively put in the corresponding fixing holes 436 of the optical film 438. In the present exemplary embodiment, each side of the optical film 438 is set with a plurality of fixing holes 436, as shown in FIG. 8. In other embodiments, only two opposite sides of the optical film 438 are each set with one fixing hole 436 and, accordingly, only two sides of the backlight module 404 are each set with one support element 432 and each support element 432 is only set with one support 426, wherein the fixing holes 436 respectively correspond to the supports 426.

In the fabrication process of the liquid crystal display 400, the backlight module 404 can be fabricated firstly, and then the display panel 402 is disposed on the backlight module 404. In the setting of the optical film set 412, the hook 430 of each support 426 is inserted into the corresponding fixing hole 436 of each optical film 438, the hook 430 of each support 426 is disposed in the opening 424 in the top surface of the supporting frame 422, and then the support 426 is fixed in the top surface of the supporting frame 422 by using the fixing hooks 440 disposed and protruding on two opposite ends of the lower surface of the pressing portion 428 of the support 426. As a result, the optical film set 412 can be pressed and fixed between the pressing portion 428 and the top surface of the supporting frame 422, as shown in FIG. 6.

In an exemplary embodiment, the hooks 430 of two corresponding supports 426 on two opposite sides of the backlight module 404 are respectively put in the corresponding fixing holes 436 of the optical film 438 and are disposed in the supporting frames 422, so that the optical film 438 can be effectively pressed and fixed on the supporting frames 422 by the pressing portions 428 of the supports 426 and can be supported by the supporting frames 422 of the support elements 432. In the present exemplary embodiment, the connection combination composed of two elastic connection portions 444 and one hook 430 is further provided, and the elastic connection portions 444 and the hook 430 are integrated into an arched structure. With the arched structure composed of the connection portions 444 and the hook 430 and the material elasticity of the connection portions 444 and the hook 430, when a force is applied to the hook 430 in a direction perpendicular to the bowstring of the arched structure, a reverse elastic force is generated by the deformation resistance force of the arched structure composed of the connection portions 444 and the hook 430. The reverse elastic force generated by the combined structure of the connection portions 444 and the hook 430 can further tension the optical film 438 with one pair of tensile forces oriented toward two opposite outer sides to evenly spread the optical film 438 and to greatly increase the evenness of the optical film 438. In the present exemplary embodiment, any two opposite sides of the backlight module 404 are each set with at least two supports 426, so that the optical films 438 can be tensioned at any two opposite sides thereof with at least two pairs of tensile forces oriented toward two opposite outer sides.

As shown in FIG. 6, the backlight module 404 is usually set with a frame 434, wherein the frame 434 is usually embedded on the side plates of the rear plate 406 and set around the rear plate 406, and a portion of the frame 434 extends on the outer region of the backlight module 404. In the liquid crystal display 400, the display panel 402 is disposed on the frame 434, wherein the frame 434 supports the edge region of the display panel 402 and separates the display panel 402 from the optical film set 412 with a gap.

With the setting of the support elements 432 on two opposite sides or four sides of the backlight module 404 and the setting of the fixing holes 436 in the optical films 438 corresponding to the locations of the supports 426, the optical film set 412 can be successfully supported and fixed by the support elements 432. Therefore, the backlight module 404 may not need any diffusion plate to support the optical film set 412, so that the cost can be reduced.

Figure 9:
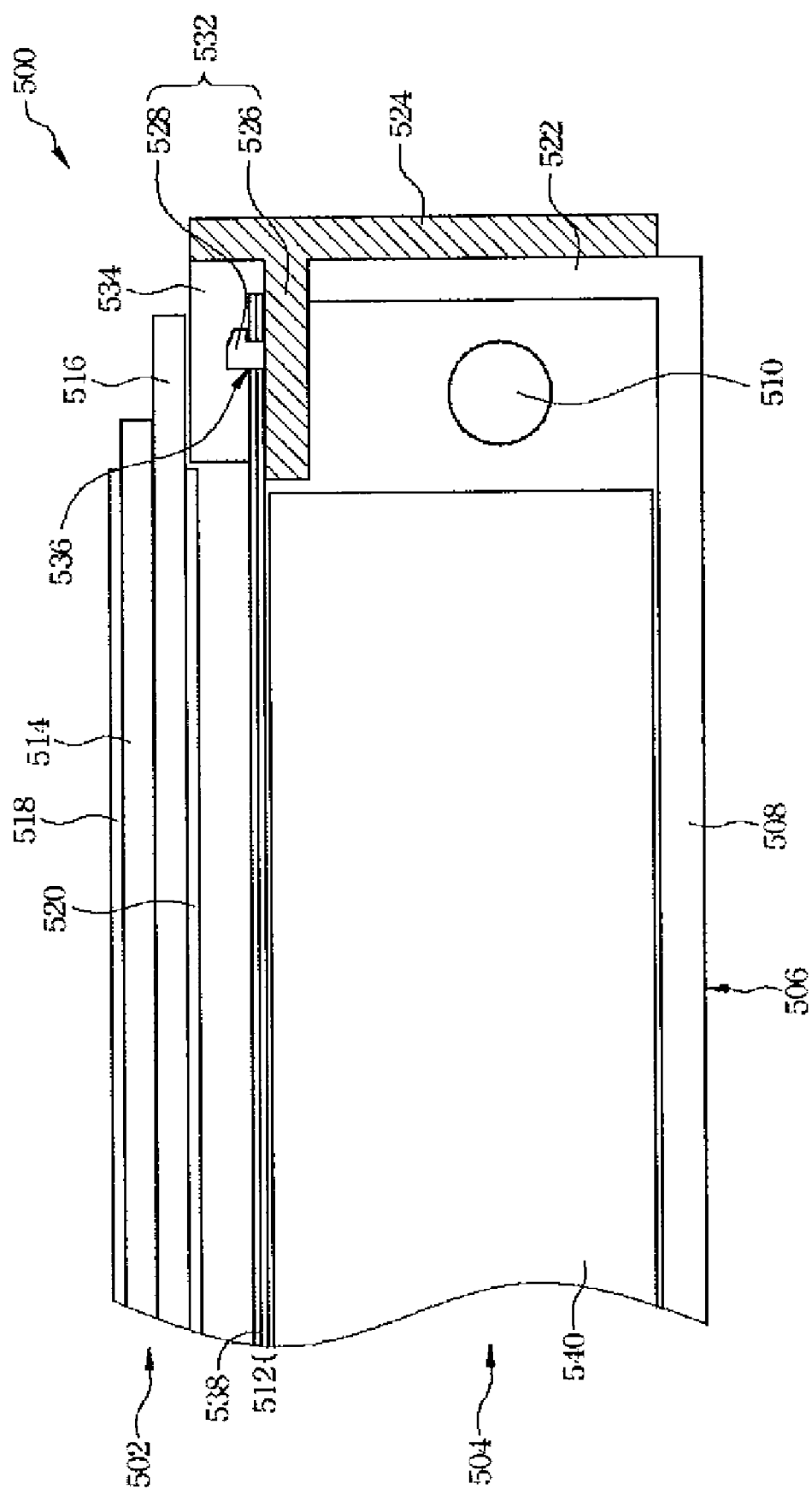
FIG. 9 is a side view of a portion of a liquid crystal display in accordance with a third embodiment of the present invention.

FIG. 9 is a side view of a portion of a liquid crystal display in accordance with a third embodiment of the present invention. A liquid crystal display 500 mainly includes a display panel 502 and a backlight module 504, wherein the display panel 502 is disposed on the backlight module 504, i.e., the backlight module 504 is on a rear side of the display panel 502. In the present embodiment, the display panel 502 is a liquid crystal display panel.

The backlight module 504 comprises a rear plate 506, at least one light source 510, a light guide plate 540, at least two support elements 532 and at least one optical film 538. The backlight module 504 of the present exemplary embodiment includes a plurality of light sources 510 and an optical film set 512 composed of two optical films 538. Typically, the rear plate 506 mainly includes a bottom plate 508 and a plurality of side plates 522 set around the bottom plate 508. The rear plate 506 may be composed of a metal plate or a hard plastic plate. The light guide plate 540 is disposed in the rear plate 506, wherein the light guide plate 540 is located on the bottom plate 508 of the rear plate 506 and is surrounded by the side plates 522. The light sources 510 are disposed in the inner side of the rear plate 506, are located on the inner side surfaces of the side plates 522 of the rear plate 506, and are respectively located between side surfaces of the light guide plate 540 and the inner side surfaces of the side plates 522. The optical film set 512 is disposed above the light guide plate 540 and the light sources 510.

In one embodiment, each support element 532 is mainly composed of a side wall 524, a carrying portion 526 and at least one hook 528. In the present exemplary embodiment, the backlight module 504 includes four support elements 532, and each support element 532 comprises a side wall 524, a carrying portion 526 and a plurality of hooks 528, wherein the support elements 532 are respectively disposed on the side plates 522 of the rear plate 506. In other embodiments, the backlight module 504 may include only two support elements 532, and the support elements 532 are respectively disposed on two opposite sides of the rear plate 506.

Figure 10A:
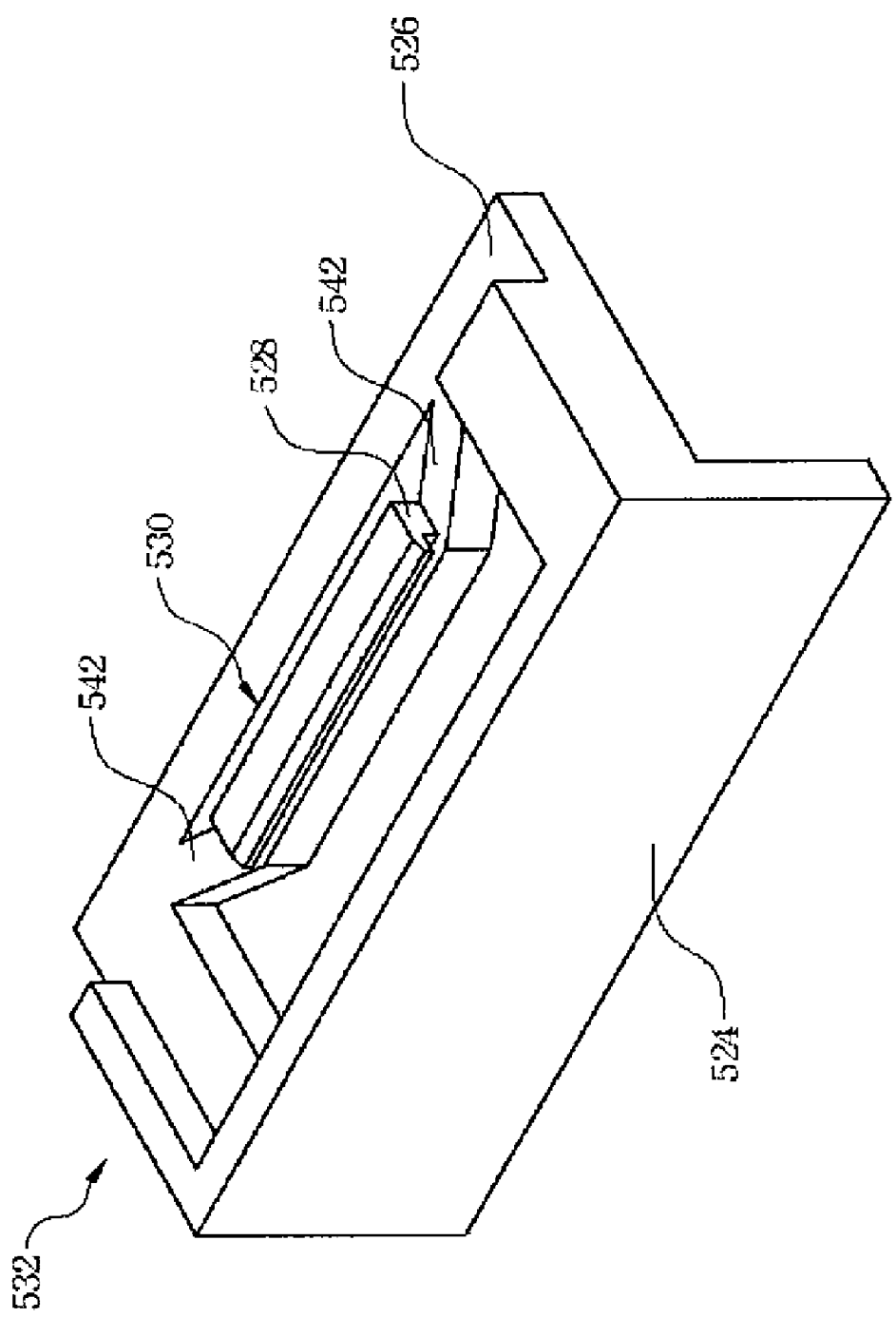
FIG. 10A is a perspective view of a back side of a support element of a backlight module in accordance with the third embodiment of the present invention.
Figure 10B:
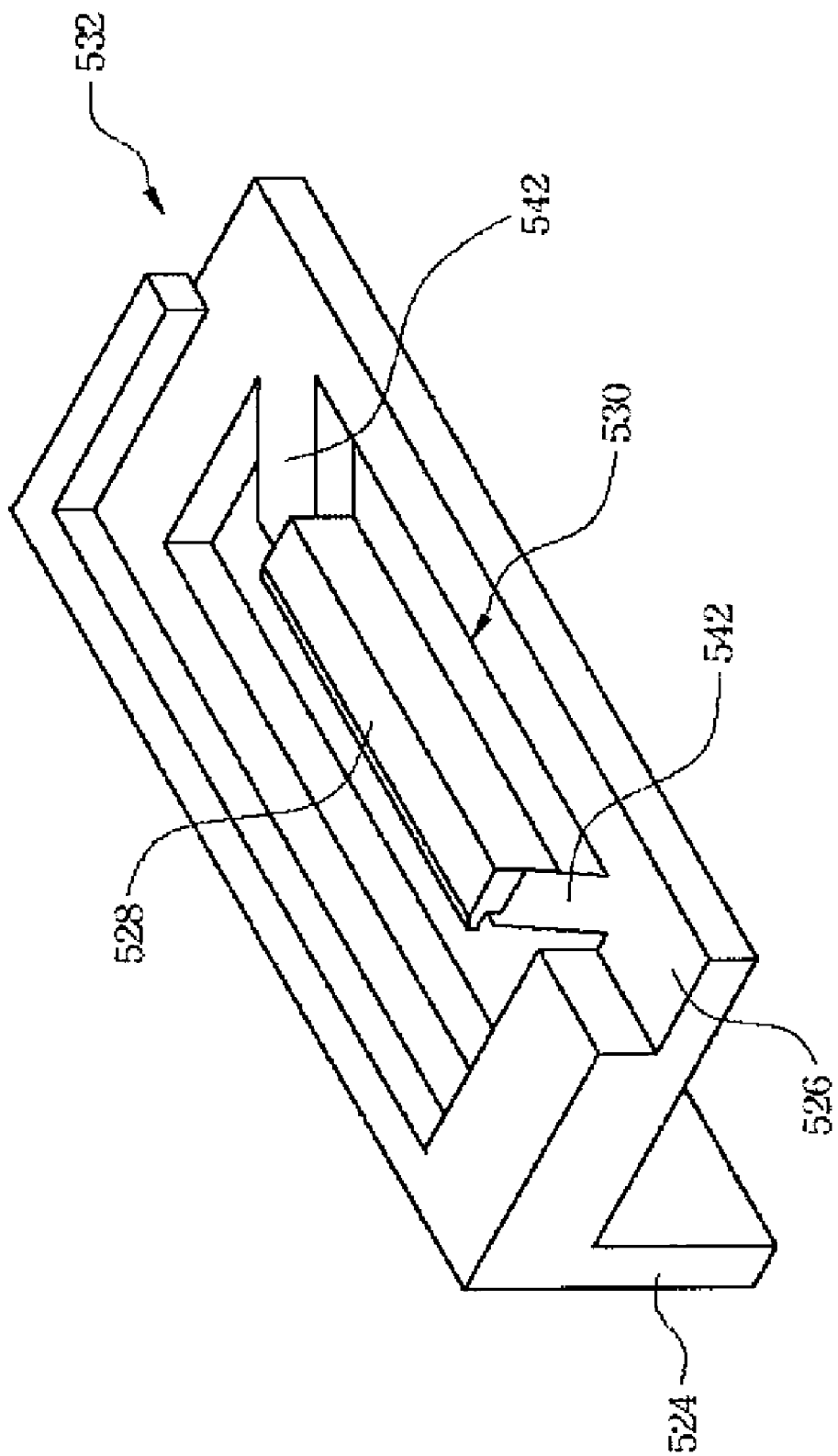
FIG. 10B is a perspective view of a front side of the support element of the backlight module in accordance with the third embodiment of the present invention.

FIG. 10A is a perspective view of a back side of the support element 532 of the backlight module in accordance with the third embodiment of the present invention, and FIG. 10B is a perspective view of a front side of the support element 532. The carrying portion 526 of each support element 532 is substantially perpendicular and connected to an inner side surface of the side wall 524, and each carrying portion 526 is set with at least one opening 530, wherein the hook 528 protrudes on a top surface of the carrying portion 526, as shown in FIGS. 10A and 10B. In the present exemplary embodiment, the carrying portion 526 of each support element 532 is set with a plurality of openings 530, and all of the hooks 528 of the support element 532 are respectively disposed in the openings 530 of the carrying portion 526. In the present exemplary embodiment, the support element 532 further comprises two elastic connection portions 542, wherein one hook 528 corresponds to two elastic connection portions 542, and two opposite ends of the hook 528 of the support element 532 can be respectively connected to inner sides of the opening 530 by the elastic connection portions 542, as shown in FIGS. 10A and 10B.

Figure 11:
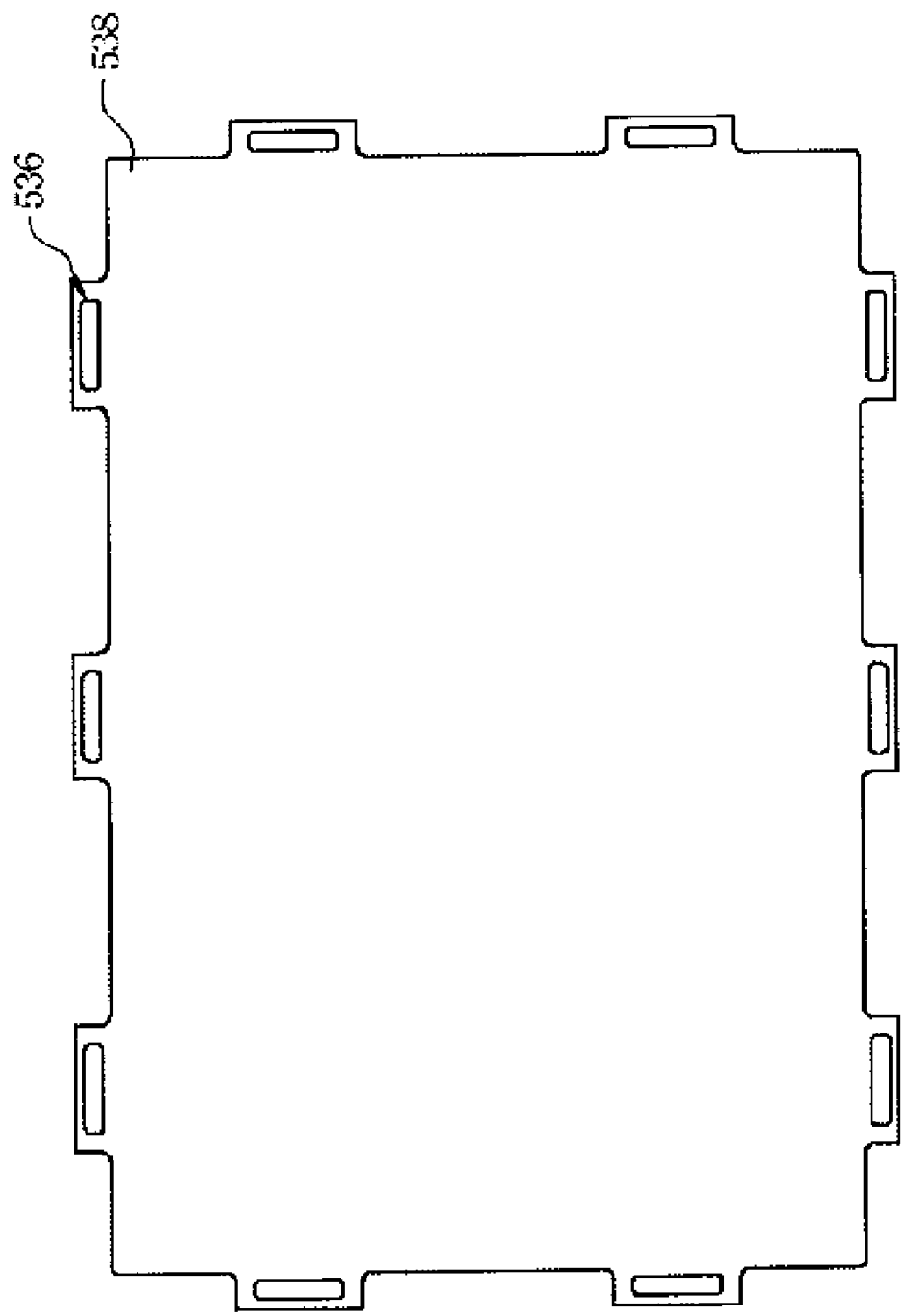
FIG. 11 is a top view of an optical film in accordance with the third embodiment of the present invention.

FIG. 11 is a top view of an optical film in accordance with the third embodiment of the present invention. Each optical film 538 of the optical film set 512 is set with at least two fixing holes 536, wherein the number and the location of the fixing holes 536 of the optical film 538 correspond to the number and the location of the hooks 528 of the support elements 532. The hooks 528 of the support elements 532 may be respectively put in the corresponding fixing holes 536 of the optical film 538. In the present exemplary embodiment, each side of the optical film 538 is set with a plurality of fixing holes 536, as shown in FIG. 11. In other embodiments, only two opposite sides of the optical film 538 are each set with one fixing hole 536, and accordingly, only two sides of the backlight module 504 are each set with one support element 532 and each support element 532 is only set with one hook 528, wherein the fixing holes 536 respectively correspond to the hooks 528.

In the fabrication process of the liquid crystal display 500, the backlight module 504 can be fabricated firstly, and then the display panel 502 is disposed on the backlight module 504. In the fabrication process of the backlight module 504, the light guide plate 540 may be firstly disposed in the rear plate 506 and on the bottom plate 508 of the rear plate 506, and at least one light source 510 is disposed between the side surface of the light guide plate 540 and the inner side surface of the side plate 522. Next, the optical film set 512 is set. When the optical film set 512 is being set, the support element 532 is firstly mounted on the side plate 522 of the rear plate 506, wherein the side wall 524 of the support element 532 is connected to an outer side surface of the side plate 522, and the carrying portion 526 is disposed on a top surface of the side plate 522 to connect a lower surface of the carrying portion 526 to the top surface of the side plate 522. The carrying portion 526 of the support element 532 extends a distance from the connection of the carrying portion 526 and the side wall 524 to the inner side of the backlight module 504 and is separated from the side surface of the light guide plate 540 with a gap, as shown in FIG. 9. Then, the optical film 538 is disposed and the hooks 528 of the support elements 532 are respectively put in the corresponding fixing holes 536 of the optical film 538, so that the optical film 538 can be effectively supported and fixed by the support elements 532, and the optical film set 512 is separated from a top surface of the light guide plate 540 with a distance, as shown in FIG. 9.

In an exemplary embodiment, the backlight module 504 may include only two support elements 532 respectively on two opposite sides of the backlight module 504. The optical films 538 can be tensioned with one pair of tensile forces oriented toward two opposite outer sides by respectively putting the hooks 528 of two corresponding support elements 532 on the two opposite sides of the backlight module 504 in the corresponding fixing holes 536 of the optical films 538, so that the optical films 538 can be effectively supported and fixed. In the present exemplary embodiment, the connection combination composed of two elastic connection portions 542 and one hook 528 is further provided, and the elastic connection portions 542 and the hook 528 are integrated into an arched structure. With the arched structure composed of the connection portions 542 and the hook 528 and the material elasticity of the connection portions 542 and the hook 528, when a force is applied to the hook 528 in a direction perpendicular to the bowstring of the arched structure, a reverse elastic force is generated by the deformation resistance force of the arched structure composed of the connection portions 542 and the hook 528. The reverse elastic force generated by the combined structure of the connection portions 542 and the hook 528 can further tension the optical films 538 with one pair of tensile forces oriented toward two opposite outer sides to evenly spread the optical films 538 and greatly increase the evenness of the optical films 538, so as to enhance the light-emitting uniformity of the backlight module 504. In the present exemplary embodiment, any two opposite sides of the backlight module 504 are each set with at least two hooks 528, so that the optical films 538 can be tensioned at any two opposite sides thereof with at least two pairs of tensile forces oriented toward two opposite outer sides.

As shown in FIG. 9, the backlight module 504 is usually set with a frame 534, wherein the frame 534 is usually embedded on the side plates 522 of the rear plate 506 and set around the rear plate 506, and a portion of the frame 534 extends on the outer region of the backlight module 504 and is located above the outer region of the optical film set 512. In the liquid crystal display 500, the display panel 502 is disposed on the frame 534, wherein the frame 534 supports the edge region of the display panel 502 and separates the display panel 502 from the optical film set 512 with a gap.

With the setting of the support elements 532 on two opposite sides or four sides of the backlight module 504 and the setting of the fixing holes 536 in the optical films 538 corresponding to the locations of the hooks 528, the optical film set 512 can be successfully supported and fixed by the support elements 532. Therefore, the backlight module 504 may not need any diffusion plate to support the optical film set 512, so that the cost can be reduced. In addition, the optical film set 512 is not directly adhered to the top surface of the light guide plate 540 and is separated from the light guide plate 540 with a distance, so that an air layer is between the optical film set 512 and the light guide plate 540 to be a light transmitting medium.

Figure 12:
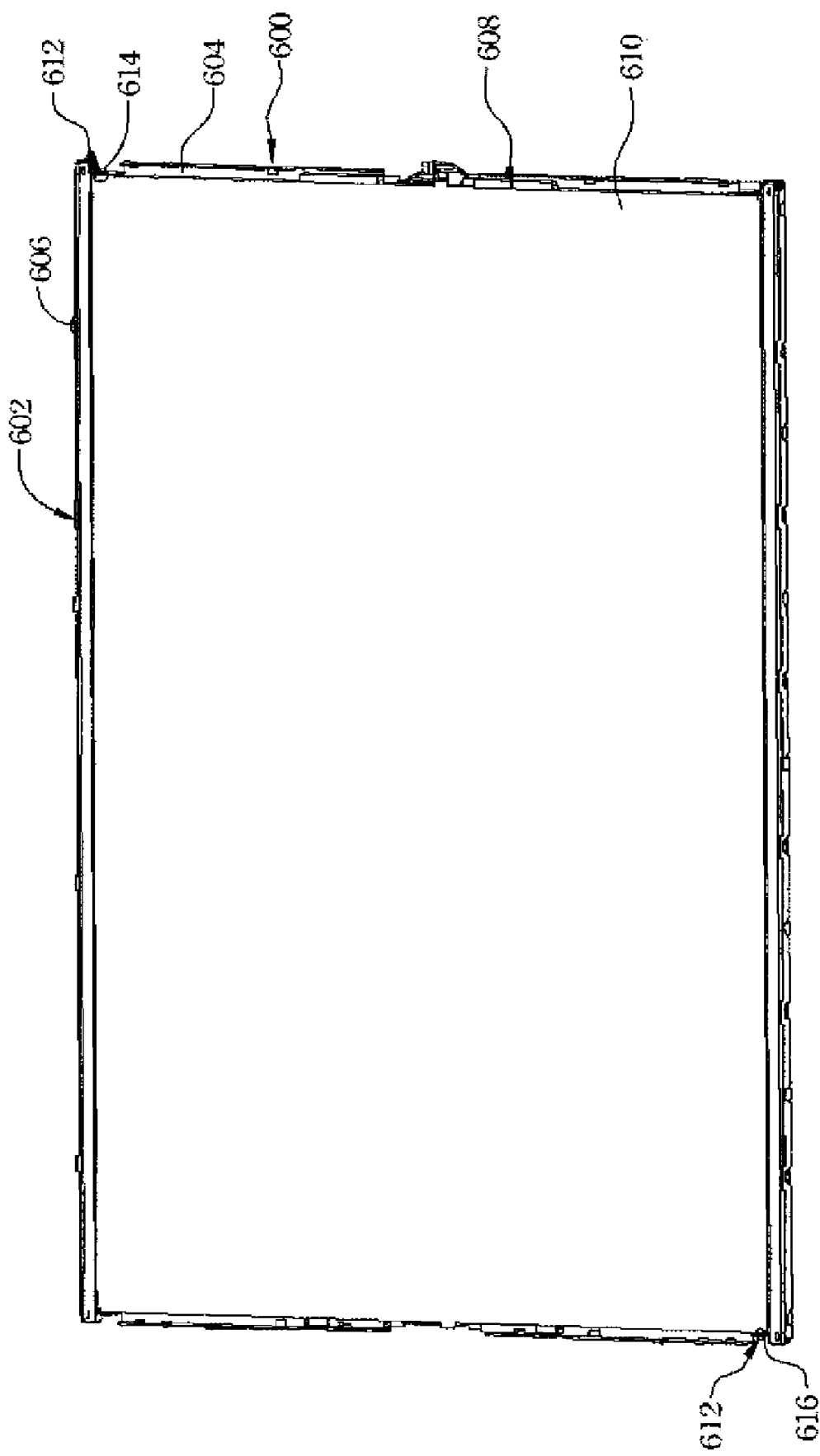
FIG. 12 is a top view of a backlight module in accordance with a fourth embodiment of the present invention.
Figure 12:
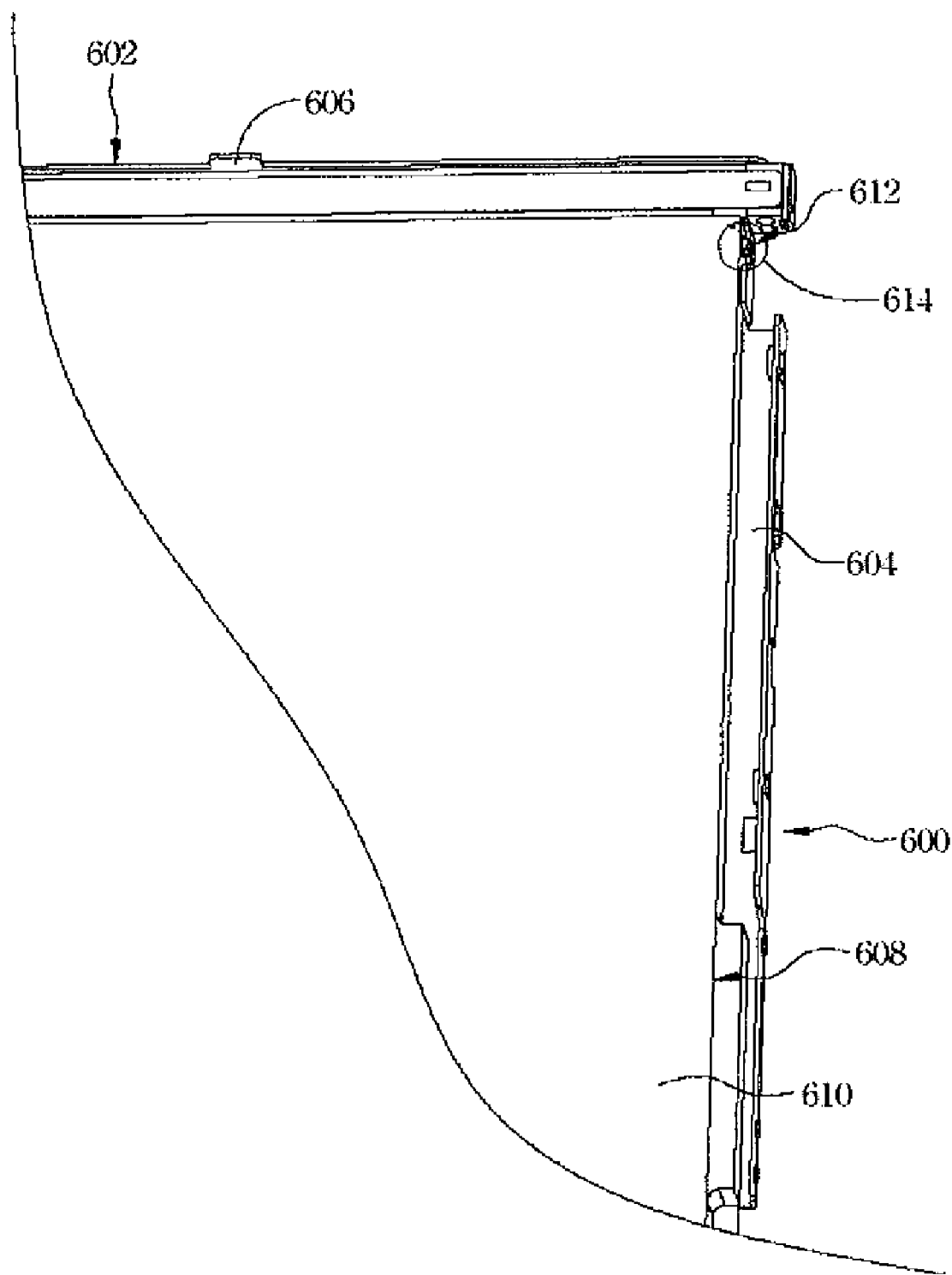

FIG. 12 is a top view of a backlight module in accordance with a fourth embodiment of the present invention, and FIG. 12A is an enlarged view of a portion of the backlight module of FIG. 12. A backlight module 600 may be applied in a display device, such as a liquid crystal display device, wherein the backlight module 600 is applied on the liquid crystal display by disposing a liquid crystal display panel on the backlight module 600.

The backlight module 600 comprises a rear plate 602, at least one light source (not shown), at least two support elements 612 and at least one optical film 610. The backlight module 600 of the present exemplary embodiment includes a plurality of light sources and an optical film set 608 composed of two optical films 610. When the backlight module 600 is a direct type backlight module, the light source of the direct type backlight module is disposed right below the optical film set 608 and between the optical film set 608 and a bottom plate 604 of the rear plate 602; and when the backlight module 600 is an edge type backlight module, the light source of the edge type backlight module is disposed on an inner side surface of a side plate 606 of the rear plate 602. Typically, the rear plate 602 mainly includes the bottom plate 604 and a plurality of side plates 606 set around the bottom plate 604. The rear plate 602 may be composed of a metal plate or a hard plastic plate. The optical film set 608 is disposed right above the bottom plate 604 of the rear plate 602 and above the light source.

Figure 13A:
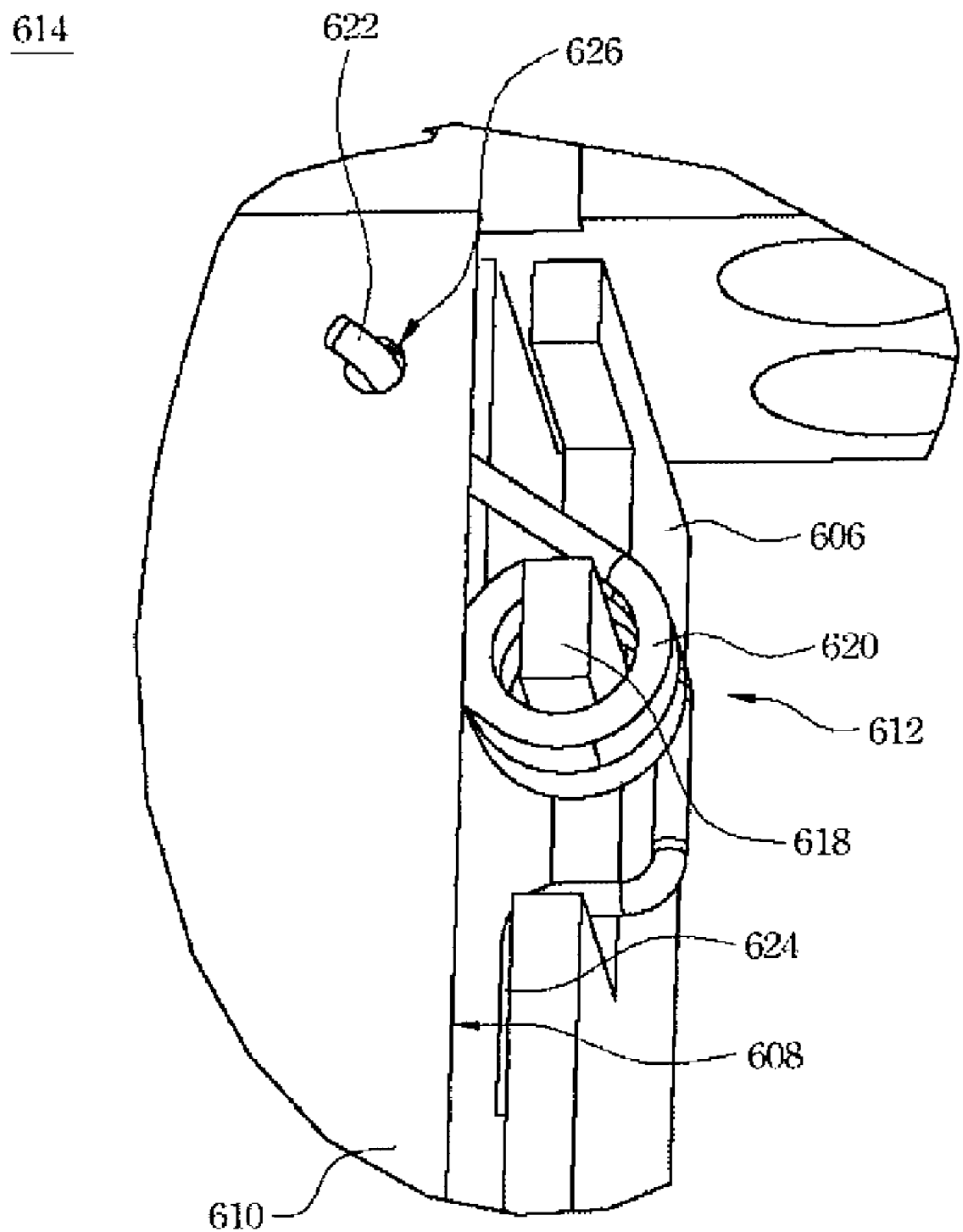
FIG. 13A is a perspective enlarged view of a corner portion of the backlight module in accordance with the fourth embodiment of the present invention.
Figure 13B:
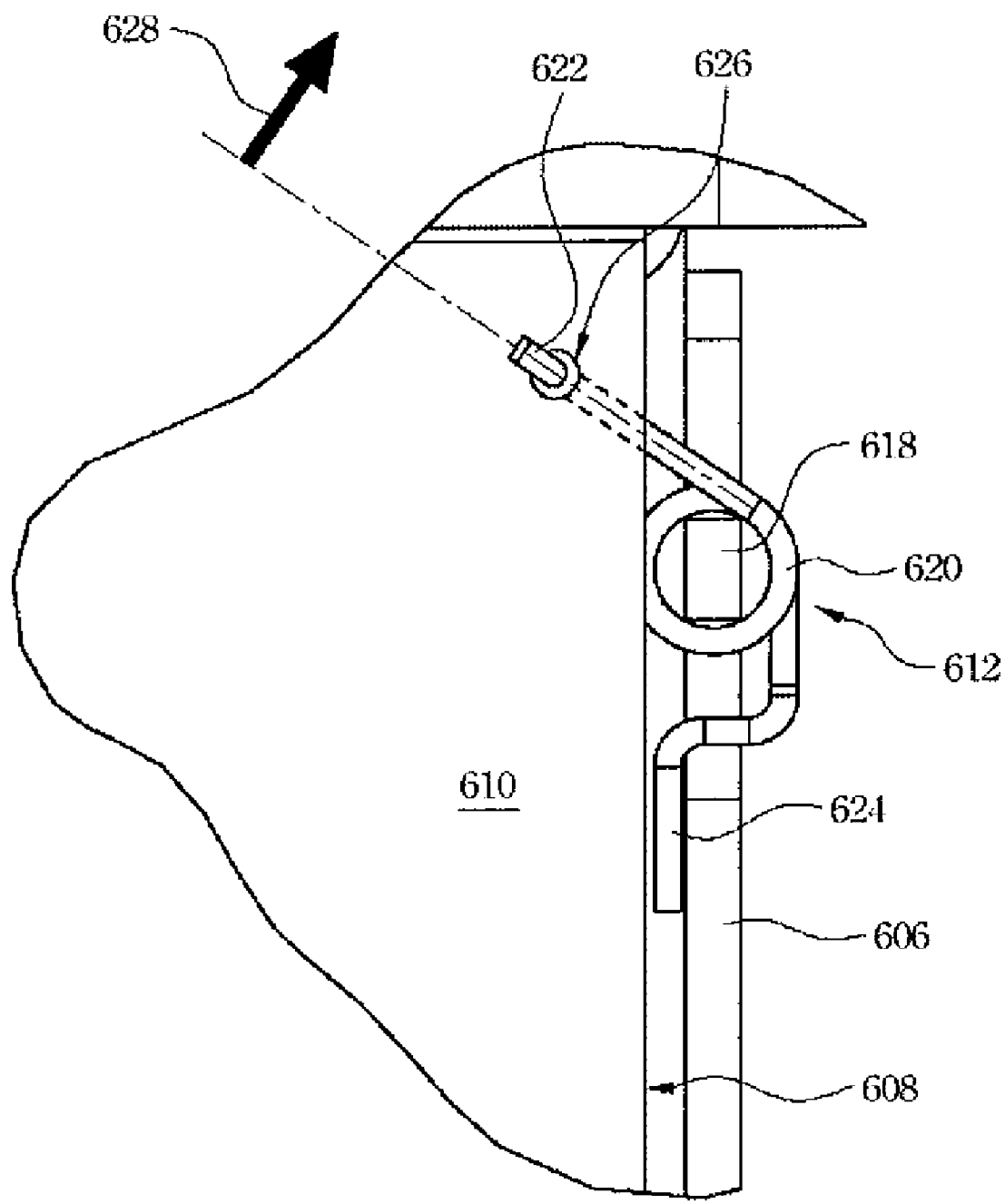
FIG. 13B is an enlarged top view of the corner portion of the backlight module in accordance with the fourth embodiment of the present invention.
Figure 13C:
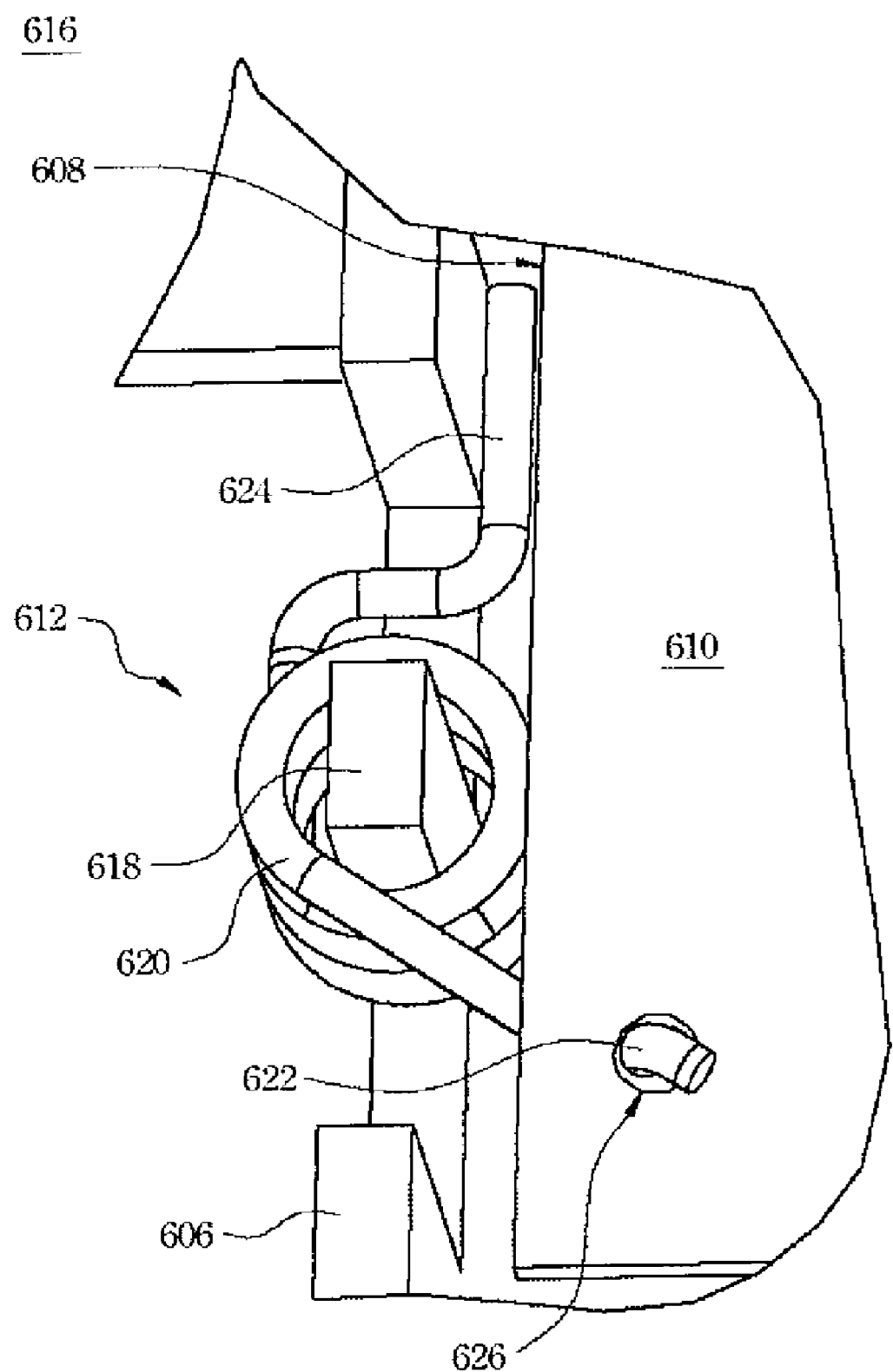
FIG. 13C is a perspective enlarged view of another corner portion of the backlight module in accordance with the fourth embodiment of the present invention.

FIG. 13A is a perspective enlarged view of a corner portion 614 (FIG. 12) of the backlight module in accordance with the fourth embodiment of the present invention, FIG. 13B is an enlarged top view of the corner portion 614 of the backlight module in accordance with the fourth embodiment of the present invention, and FIG. 13C is a perspective enlarged view of another corner portion 616 of the backlight module in accordance with the fourth embodiment of the present invention. In one embodiment, each support element 612 is mainly composed of an elastic element 620, a hook portion 622 and a hook portion 624, wherein the hook portion 622 is connected to one end of the elastic element 620, and the hook portion 624 is connected to another end of the elastic element 620, as shown in FIGS. 13A and 13C. A material of the support element 612 may be a metal material or a plastic material. In the present exemplary embodiment, the backlight module 600 includes four support elements 612, and the support elements 612 are respectively disposed on the side plates 606 of the rear plate 602, and are, in some embodiments, disposed in four corner regions of the rear plate 602, as shown in FIG. 12. In other embodiments, the backlight module 600 may only include two support elements 612, and the support elements 612 are respectively disposed on two opposite corner regions, e.g., 614 and 616 (FIG. 12) of the rear plate 602. At least two of the side plates 606 of the rear plate 602, such as two opposite side plates 606, each further includes at least one fixing pillar 618, wherein the fixing pillars 618 can be put in the elastic elements 620 of the support elements 612 to fix the elastic elements 620. In the present exemplary embodiment, the backlight module 600 includes four support elements 612, and each of two opposite side plates 606 of the rear plate 602 is set with two fixing pillars 618, wherein the fixing pillars 618 are put in the elastic elements 620 to fix the support elements 612. However, in other embodiments, in the backlight module 600 including four support elements 612, four side plates 606 of the rear plate 602 are each respectively set with a fixing pillar 618 to correspondingly fix the four support elements 612.

Each optical film 610 of the optical film set 608 is set with at least two fixing holes 626, wherein the number and the location of the fixing holes 626 of the optical film 610 correspond to the number and the location of the support elements 612. The hook portion 622 on one end of the support element 612 is hooked in the corresponding fixing hole 626 of the optical film 610, and the hook portion 624 on the other end of the support element 612 is hooked on an inner side surface of the side plate where the fixing pillar 618 is formed, as shown in FIGS. 13A and 13C. In the present exemplary embodiment, each corner region of the optical film 610 is set with a fixing hole 626, as shown in FIG. 13A. In other embodiments, only two opposite corner regions of the optical film 610 are each respectively set with one fixing hole 626, and accordingly, only those two opposite corner regions of the backlight module 600 are each respectively set with one support element 612, wherein the fixing holes 626 are respectively corresponding to the support-elements 612 of the backlight module 600.

In an exemplary embodiment, the backlight module 600 only includes two corresponding support elements 612 disposed in two opposite corner regions 614 and 616 of the backlight module 600. As shown in FIGS. 12 and 13B, the hook portions 622 of two corresponding support elements 612 in two opposite corner regions of the backlight module 600 are respectively put in the corresponding fixing holes 626 of the optical film 610, and a deformation resistance force of the support elements 612 is caused by the tension in the optical film 610, so that the optical film 610 can be tensioned with one pair of tensile forces oriented toward two opposite outer sides, such as a tensile force 628 shown in FIG. 13B, wherein the tensile force 628 is one of the pair of tensile forces applied on the optical film 610, and the direction of the other one of the pair of tensile forces is, in some embodiments, substantially opposite to that of tensile force 628. Therefore, the optical film 610 can be effectively supported and fixed by setting support elements 612 respectively in two opposite corner regions of the backlight module 600.

With the setting of the support elements 612 in two opposite corner regions or four corner regions of the backlight module 600 and the setting of the fixing holes 626 in the optical films 610 corresponding to the locations of the support elements 612, the optical film set 608 can be successfully supported and fixed by the support elements 612. Therefore, the backlight module 600 may not need any diffusion plate to support the optical film set 608, so that the cost can be reduced. In addition, the optical film set 608 is separated from the light guide plate, so that an air layer is present between the optical film set 608 and the light guide plate to be a light transmitting medium.

Figure 14:
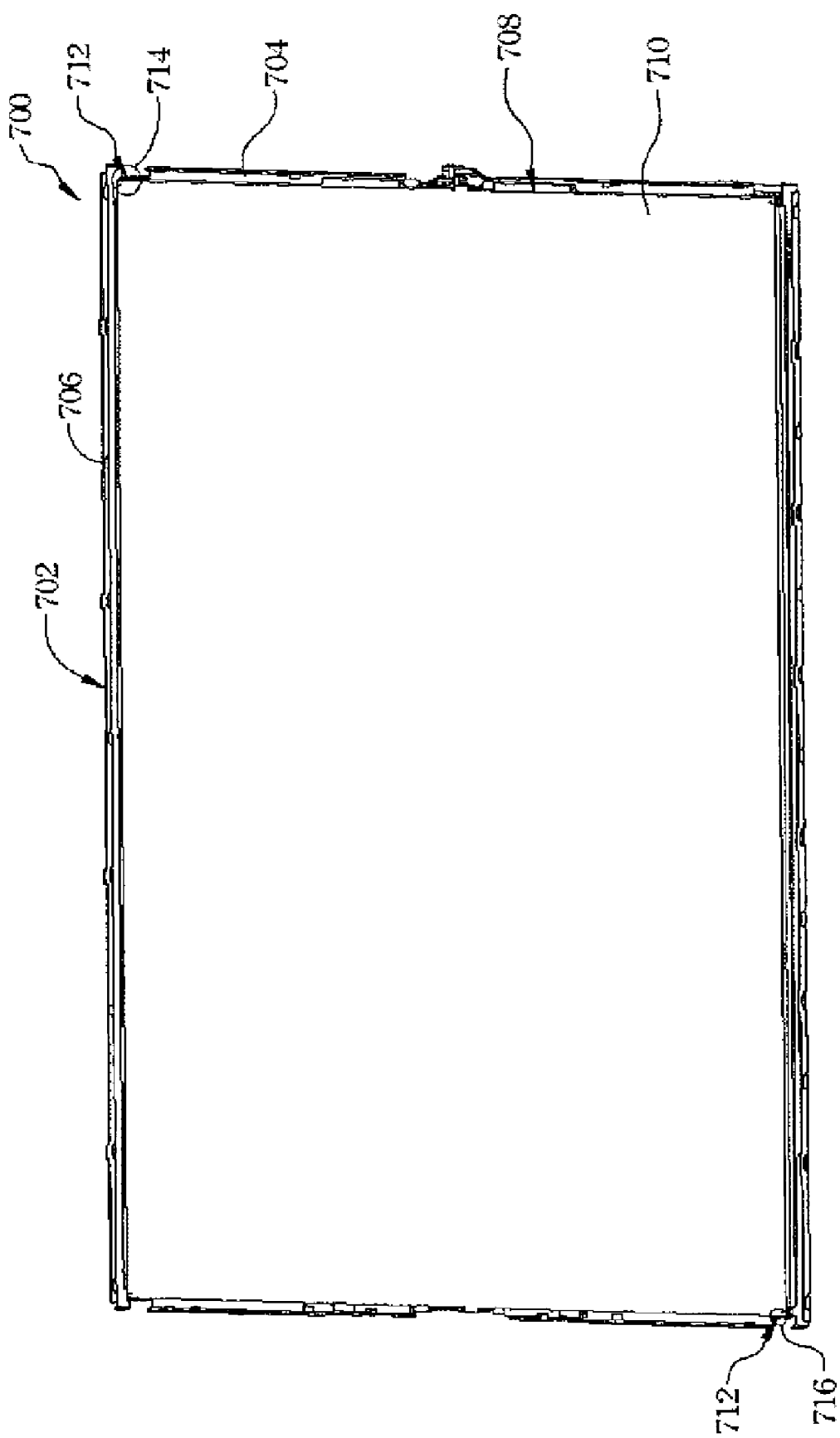
FIG. 14 is a top view of the backlight module in accordance with a fifth embodiment of the present invention.
Figure 14:
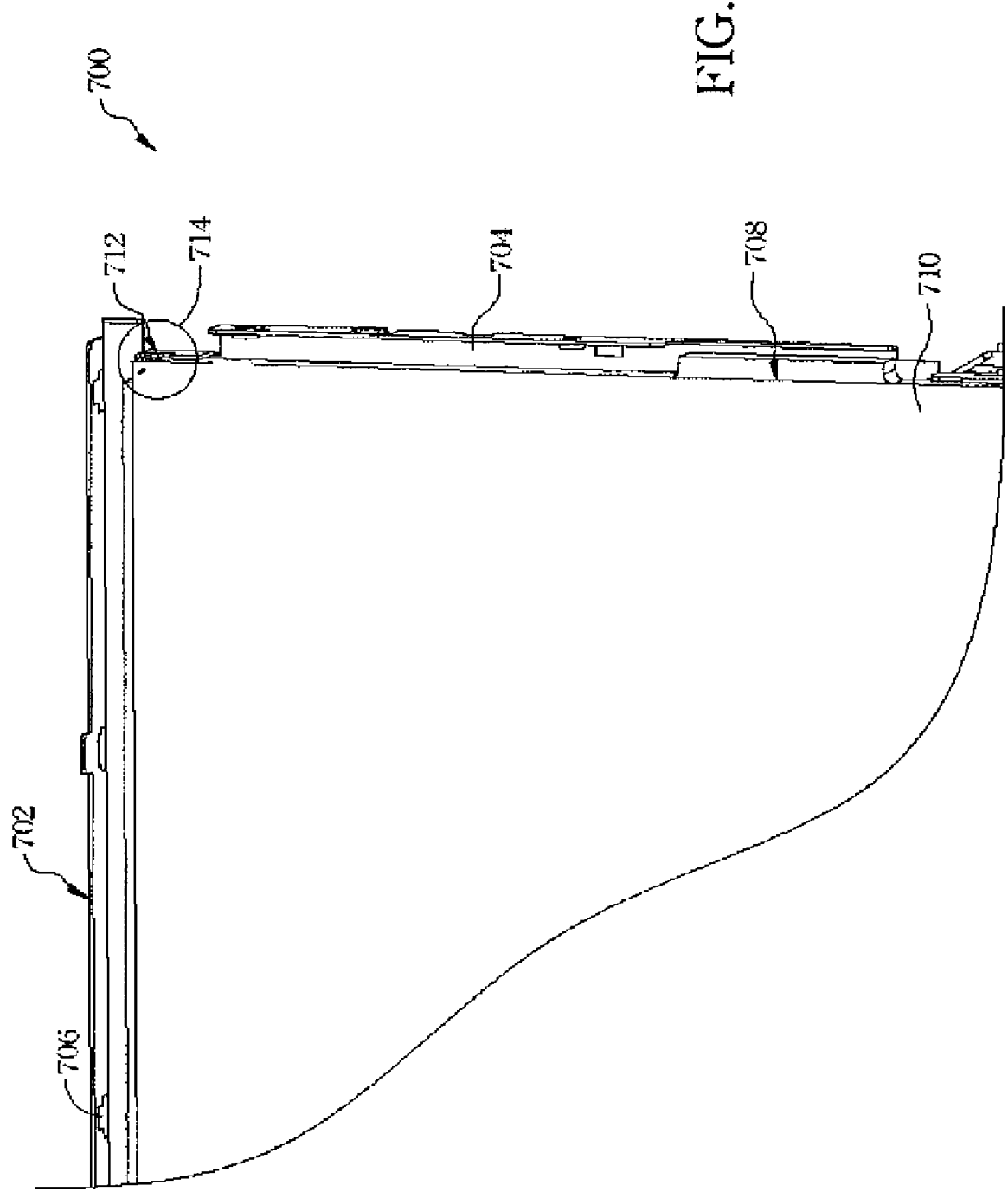

FIG. 14 is a top view of a backlight module in accordance with a fifth embodiment of the present invention, and FIG. 14A is an enlarged view of a portion of the backlight module of FIG. 14. A backlight module 700 may be applied in a display device, such as a liquid crystal display device, wherein the backlight module 700 is applied on the liquid crystal display by disposing a liquid crystal display panel on the backlight module 700.

The backlight module 700 comprises a rear plate 702, at least one light source (not shown), at least two support elements 712 and at least one optical film 710. The backlight module 700 of the present exemplary embodiment includes a plurality of light sources and an optical film set 708 composed of two optical films 610. When the backlight module 700 is a direct type backlight module, the light source of the direct type backlight module is disposed right below the optical film set 708 and between the optical film set 708 and a bottom plate 704 of the rear plate 702; and when the backlight module 700 is an edge type backlight module, the light source of the edge type backlight module is disposed on an inner side surface of a side plate 706 of the rear plate 702. Typically, the rear plate 702 mainly includes the bottom plate 704 and a plurality of side plates 706 set around the bottom plate 704. The rear plate 702 may be composed of a metal plate or a hard plastic plate. The optical film set 708 is disposed right above the bottom plate 704 of the rear plate 702 and above the light source.

Figure 15A:
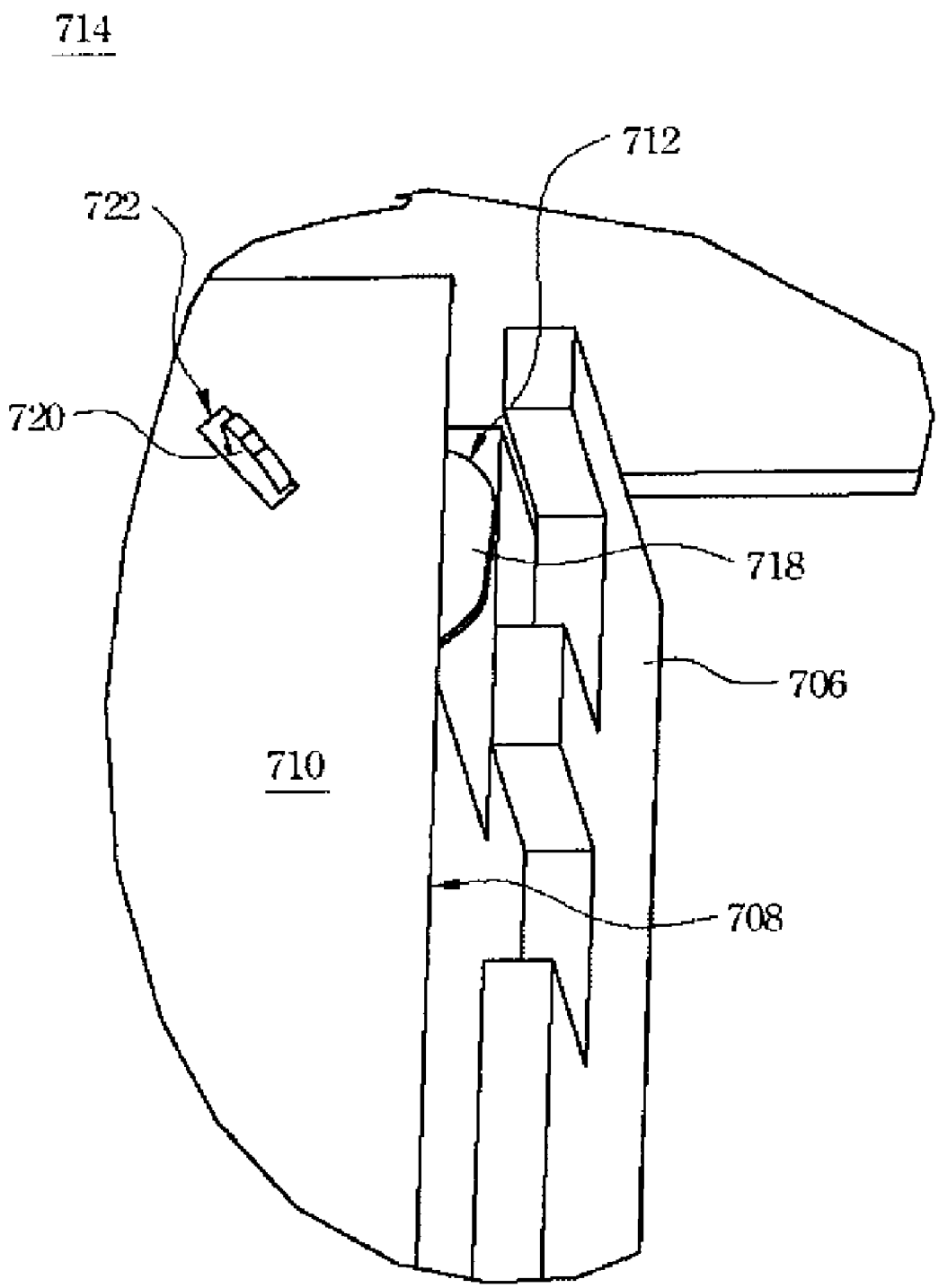
FIG. 15A is a perspective enlarged view of a corner portion of the backlight module in accordance with the fifth embodiment of the present invention.
Figure 15B:
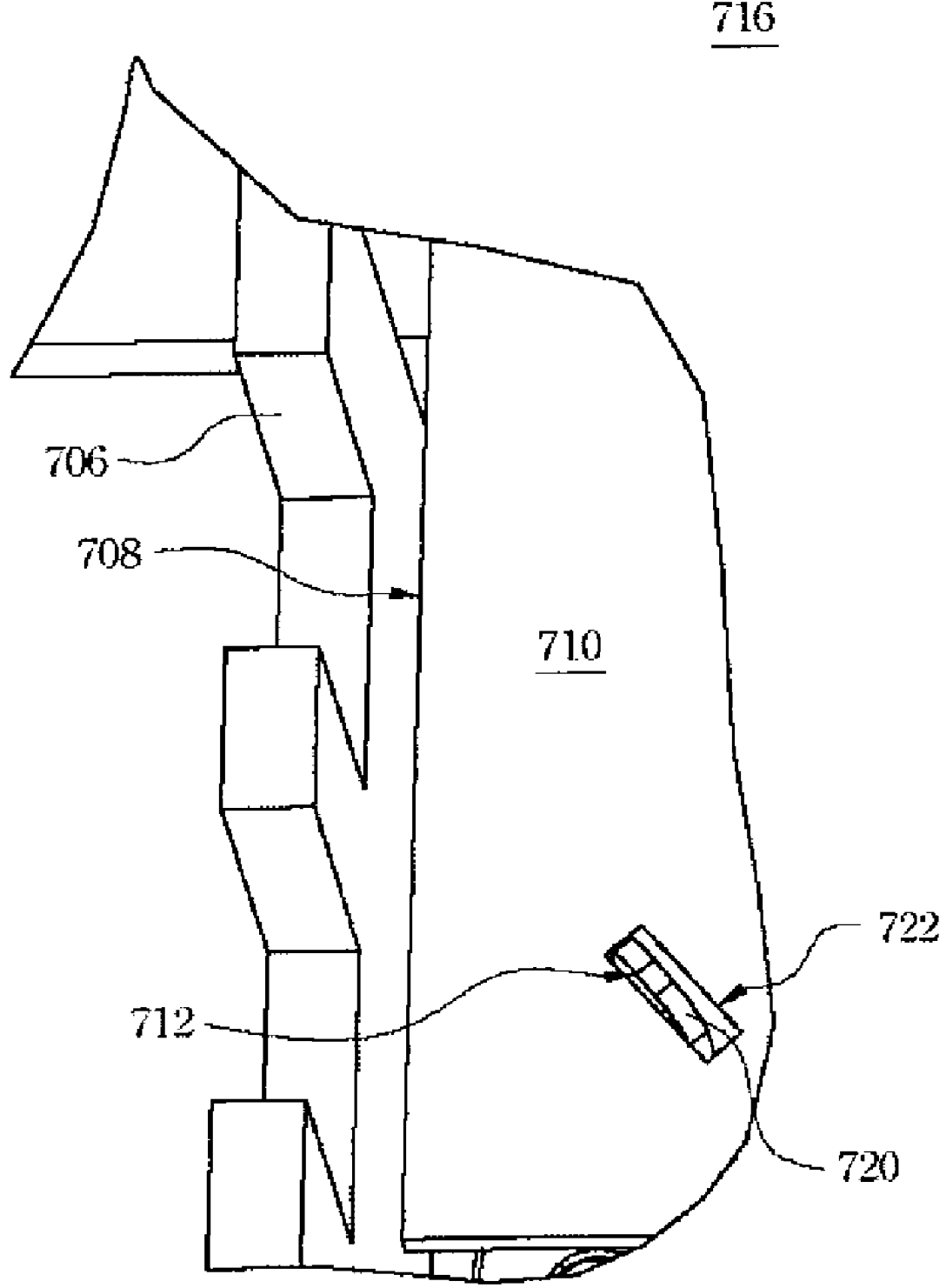
FIG. 15B is a perspective enlarged view of another corner portion of the backlight module in accordance with the fifth embodiment of the present invention.
Figure 15C:
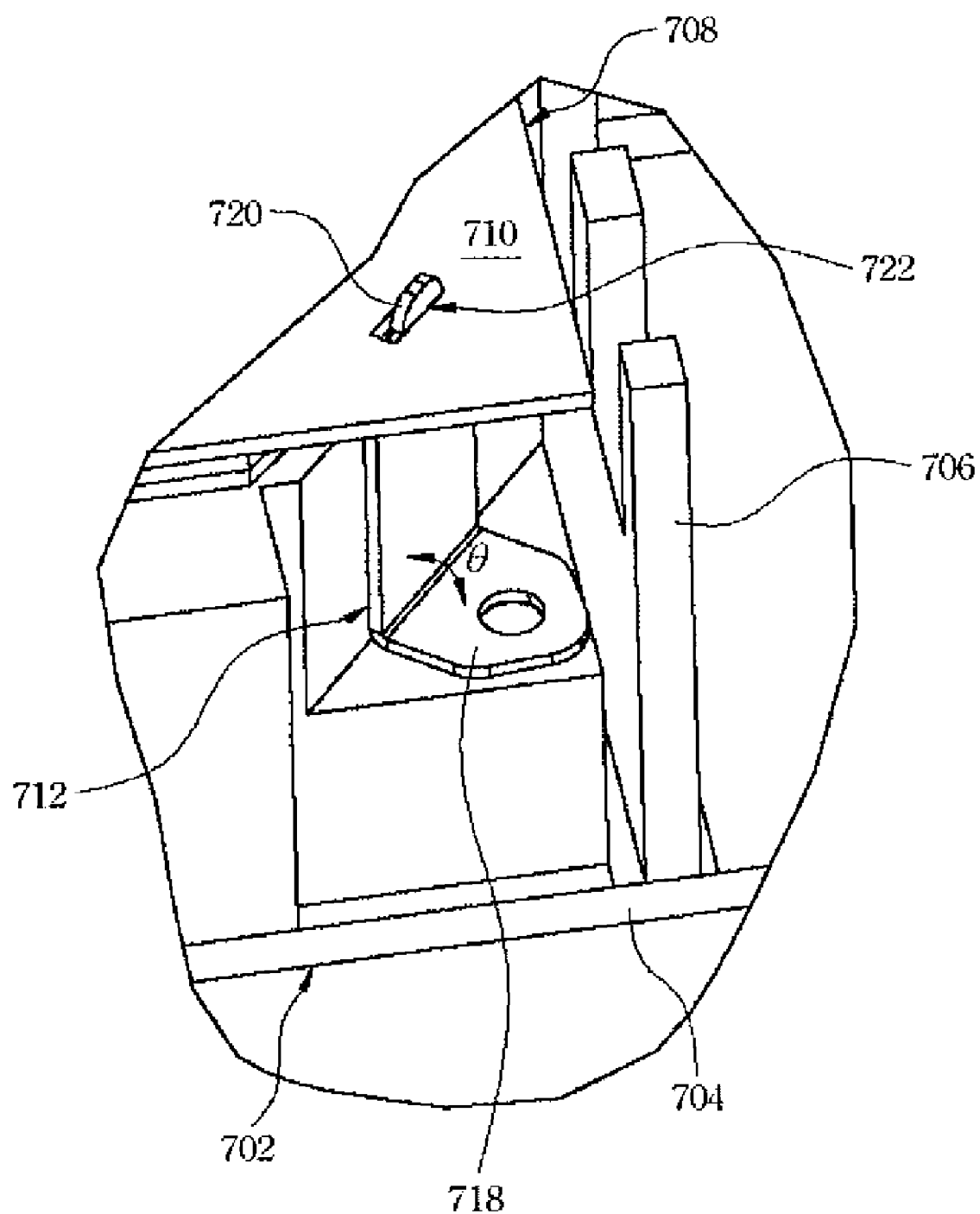
FIG. 15C is an enlarged top view of a support element of the backlight module in accordance with the fifth embodiment of the present invention.

FIG. 15A is a perspective enlarged view of a corner portion 714 (FIG. 14) of the backlight module in accordance with the fifth embodiment of the present invention, FIG. 15B is a perspective enlarged view of another corner portion 716 (FIG. 14) of the backlight module in accordance with the fifth embodiment of the present invention, and FIG. 15C is an enlarged top view of a support element of the backlight module in accordance with the fifth embodiment of the present invention. In one embodiment, each support element 712 is a fixing plate, and the support element 712 is mainly composed a plate 718 and plate 720, wherein one side of the plate 718 is connected to one side of the plate 720. In the present exemplary embodiment, the plate 718 and the plate 720 are combined to form an L-shaped like structure, wherein the plate 718 is horizontally disposed on the rear plate 702, a side of the plate 720 is connected to the nearer side of the plate 718 from the interior of the backlight module 700 and stands on the rear plate 702, and an angle θ is formed between the plate 720 and the plate 718, as shown in FIG. 15C. The angle θ may be substantially 90 degrees, and the angle θ is, in some embodiments, less than 90 degrees. In other embodiments, the plate 718 and the plate 720 are combined to form a L-shaped like structure, wherein the plate 718 is horizontally disposed on the rear plate 702, a side of the plate 720 is connected to the farther side of the plate 718 from the interior of the backlight module 700 and stands on the rear plate 702, and an angle between the plate 720 and the plate 718 may be 90 degrees or, in some embodiments, is greater than 90 degrees. A material of the support element 712 may be a metal material or a plastic material, and is, in some embodiments, an elastic material.

In an exemplary embodiment, the backlight module 700 includes four support elements 712 respectively disposed on the rear plate 702, wherein the support elements 712 are, in some embodiments, disposed in four corner regions of the rear plate 702, as shown in FIG. 14. In other embodiments, the backlight module 700 may only include two support elements 712 respectively disposed in two opposite corner regions, e.g., 714, 716 (FIG. 4) of the rear plate 702.

Each optical film 710 of the optical film set 708 is set with at least two fixing holes 722, wherein the number and the location of the fixing holes 722 of the optical film 710 correspond to the number and the location of the plates 720 of the support elements 712. Top portions of the plates 720 of the support elements 712 can be respectively put in the corresponding fixing holes 722 of the optical film 710, as shown in FIGS. 15A, 15B and 15C. In the present exemplary embodiment, each corner region of the optical film 710 is set with a fixing hole 722, as shown in FIG. 14. In other embodiments, only two opposite corner regions of the optical film 710 are each respectively set with one fixing hole 722, and accordingly, only those two opposite corner regions of the backlight module 700 are each respectively set with one support element 712, wherein the fixing holes 722 respectively correspond to the plate 720 of the support elements 712 of the backlight module 700.

In an exemplary embodiment, the backlight module 700 only includes two corresponding support elements 712 disposed in two opposite corner regions of the backlight module 700. As shown in FIGS. 14, 15A, 15B and 15C, the plates 720 of two corresponding support elements 712 in two opposite corner regions of the backlight module 700 are respectively put in the corresponding fixing holes 722 of the optical film 710, and a deformation resistance force of the support elements 712 is caused by the tension in the optical film 710, so that the optical film 710 can be tensioned with one pair of tensile forces oriented toward two opposite outer side. Therefore, the optical film 710 can be effectively supported and fixed by setting support elements 712 respectively in two opposite corner regions of the backlight module 700.

With the setting of the support elements 712 in two opposite corner regions or four corner regions of the backlight module 700 and the setting of the fixing holes 722 in the optical films 710 corresponding to the locations of the support elements 712, the optical film set 708 can be successfully supported and fixed by the support elements 712. Therefore, the backlight module 700 may not need any diffusion plate to support the optical film set 708, so that the cost can be reduced. In addition, the optical film set 708 is separated from the light guide plate, so that an air layer is present between the optical film set 708 and the light guide plate to be a light transmitting medium.

According to the above description, a backlight module in accordance with embodiments of the present invention includes a plurality of support elements for optical films, so that the optical films can be effectively supported and fixed without the supporting of a diffusion plate, thereby solving the problem of setting optical films in a backlight module without a diffusion plate.

According to the above description, support elements of a backlight module in accordance with embodiments of the present invention can support a plurality of optical films and can separate the optical films from a light guide to form a gap between the optical films and the light guide plate, so that the optical quality of the backlight module can be enhanced.

According to the above description, a backlight module of a liquid crystal display in accordance with embodiments of the present invention includes support elements for optical films to prevent the optical films from being deformed, so that the optical films can be separated from a polarizer of a liquid crystal panel with a gap to prevent the polarizer from being scraped by the contacting and rubbing between the optical films and the polarizer, and a mura effect in a display frame can be prevented from occurring.

While the disclosure has been given by way of examples and in terms of embodiments, it is to be understood that the invention is not limited thereto. On the contrary, it is intended to cover various modifications and similar arrangements included within the spirit and scope of the appended claims, the scope of which should be accorded the broadest interpretation so as to encompass all such modifications and similar structures.

What is claimed is:

1. A backlight module, comprising:
   a rear plate;
   at least one light source disposed on the rear plate;
   at least two support elements respectively disposed on two opposite sides of the rear plate; and
   at least one optical film disposed above the light source, wherein the optical film includes at least two fixing holes respectively corresponding to the support elements, and the support elements respectively engage with the fixing holes to tension the optical film with at least one pair of tensile forces oriented in opposite directions.

2. The backlight module according to claim 1, wherein each of the support elements comprises:
   a supporting frame disposed at the corresponding side of the rear plate; and at least one support disposed in the supporting frame to engage with the respective fixing hole in the optical film.

3. The backlight module according to claim 2, wherein each of the supports is rotatably supported by the supporting frame and comprises a hook that engages with the respective fixing hole in the optical film.

4. The backlight module according to claim 2, wherein each of the supports comprises:
a pressing portion including an opening; and
a hook protruding in the opening of the pressing portion and engaging the corresponding fixing hole to tension the optical film,
wherein the optical film is pressed and fixed between the pressing portion and the supporting frame.

5. The backlight module according to claim 4, wherein
each of the supports further comprises two fixing hooks respectively disposed on two opposite ends of the pressing portion and locked in the corresponding supporting frame, and
the fixing hooks and the hook protrude on the same side of the pressing portion.

6. The backlight module according to claim 4, wherein each of the support elements further comprises elastic connecting portions that connect the hook to a peripheral edge of the opening.

7. The backlight module according to claim 1, wherein each of the support elements comprises an elastic element supported at the corresponding side of the rear plate for tensioning the optical film with elasticity of said elastic element.

8. The backlight module according to claim 7, wherein;
a first end of the elastic element is engaged with the corresponding fixing hole; and
a second end of the elastic element is engaged with the corresponding side of the rear plate.

9. The backlight module according to claim 1, wherein the support elements are a plurality of fixing plates engaging with the corresponding fixing holes.

10. An optical film support arrangement for a backlight module of a liquid crystal display, said arrangement comprising:
a rear plate;
at least two support elements respectively disposed on two opposite sides of the rear plate for respectively engaging at least two fixing holes of an optical film to be supported and for tensioning the optical film with at least one pair of tensile forces oriented in opposite directions.

11. A liquid crystal display, comprising:
a backlight module comprising:
a rear plate;
at least one light source disposed on the rear plate;
at least two support elements respectively disposed on two opposite sides of the rear plate; and
at least one optical film disposed above the light source, wherein the optical film includes at least two fixing holes respectively corresponding to the support elements, and the support elements respectively engage with the fixing holes to tension the optical film with at least one pair of tensile forces oriented in opposite directions; and
a display panel disposed on the backlight module.

12. The liquid crystal display according to claim 11, wherein each of the support elements comprises:
a supporting frame disposed at the corresponding side of the rear plate; and
at least one support disposed in the supporting frame to engage with the respective fixing hole in the optical film.

13. The liquid crystal display according to claim 12, wherein each of the supports is rotatably supported by the supporting frame and comprises a hook that engages with the respective fixing hole in the optical film.

14. The liquid crystal display according to claim 12, wherein each of the supports comprises:
a pressing portion including an opening; and
a hook protruding in the opening of the pressing portion and engaging the corresponding fixing hole to tension the optical film,
wherein the optical film is pressed and fixed between the pressing portion and the supporting frame.

15. The liquid crystal display according to claim 14, wherein
each of the supports further comprises two fixing hooks respectively disposed on two opposite ends of the pressing portion and locked in the corresponding supporting frame, and
the fixing hooks and the hook protrude on the same side of the pressing portion.

16. The liquid crystal display according to claim 14, wherein each of the support elements farther comprises elastic connecting portions that connect the hook to a peripheral edge of the opening.

17. The liquid crystal display according to claim 11, wherein each of the support elements comprises an elastic element supported at the corresponding side of the rear plate for tensioning the optical film with elasticity of said elastic element.

18. The liquid crystal display according to claim 17, wherein
a first end of the elastic element is engaged with the corresponding fixing hole; and
a second end of the elastic element is engaged with the corresponding side of the rear plate.

19. The liquid crystal display according to claim 11, wherein the support elements are a plurality of fixing plates engaging with the corresponding fixing holes.

20. The arrangement according to claim 10, wherein each of the support elements comprises an elastic element supported at the corresponding side of the rear plate for tensioning the optical film with elasticity of said elastic element.

* * * * *